(12) United States Patent
West et al.

(10) Patent No.: US 7,926,971 B2
(45) Date of Patent: Apr. 19, 2011

(54) BATTERY PACK ASSEMBLIES AND PORTABLE LIGHTING DEVICES EMPLOYING SAME

(75) Inventors: Stacey H. West, Temecula, CA (US); Robert P. Radloff, Corona, CA (US)

(73) Assignee: Mag Instrument, Inc., Ontario, CA (US)

( * ) Notice: Subject to any disclaimer, the term of this patent is extended or adjusted under 35 U.S.C. 154(b) by 270 days.

(21) Appl. No.: 12/353,820

(22) Filed: Jan. 14, 2009

(65) Prior Publication Data

US 2010/0177507 A1    Jul. 15, 2010

(51) Int. Cl.
*F21L 13/00* (2006.01)
(52) U.S. Cl. ........ 362/183; 362/202; 320/107; 320/112; 320/116; 429/99; 429/100

(58) Field of Classification Search .................. 362/183, 362/202, 205; 320/107, 112, 116; 429/99, 429/100
See application file for complete search history.

(56) References Cited

U.S. PATENT DOCUMENTS

| 7,513,660 | B2 * | 4/2009 | Spartano et al. | 362/373 |
| 7,609,005 | B2 * | 10/2009 | West | 315/200 A |
| 2005/0276042 | A1 * | 12/2005 | Ho | 362/205 |
| 2006/0202818 | A1 * | 9/2006 | Greenberg | 340/539.13 |
| 2007/0291126 | A1 * | 12/2007 | Morishita et al. | 348/207.99 |

* cited by examiner

*Primary Examiner* — Ali Alavi
(74) *Attorney, Agent, or Firm* — Jones Day

(57) ABSTRACT

A portable electronic device, such as a flashlight, with a battery pack assembly is provided. The battery pack assembly has a cylindrically shaped housing with a base and a cover that form a chamber to hold a battery pack. A printed circuit board is installed in the cylindrically shaped housing to provide multiple functions to the portable electronic device.

38 Claims, 22 Drawing Sheets

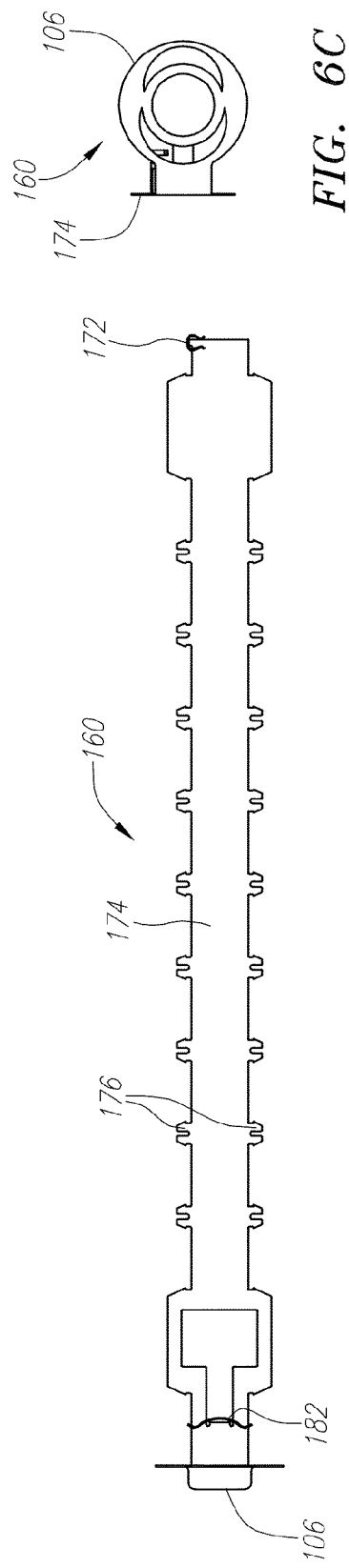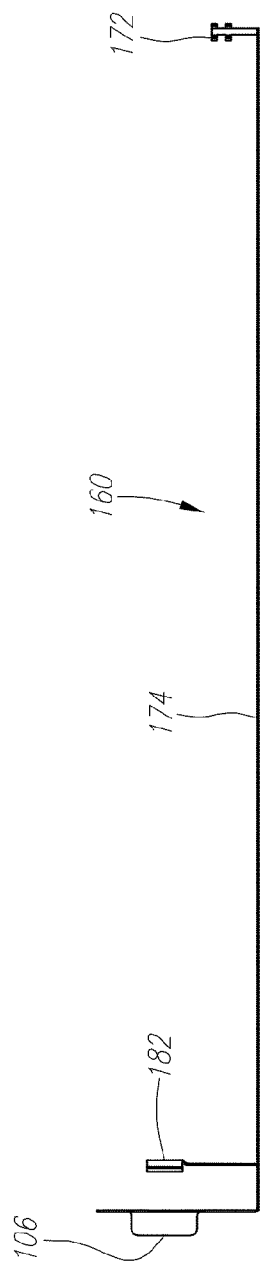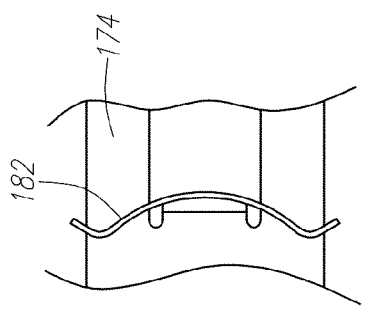

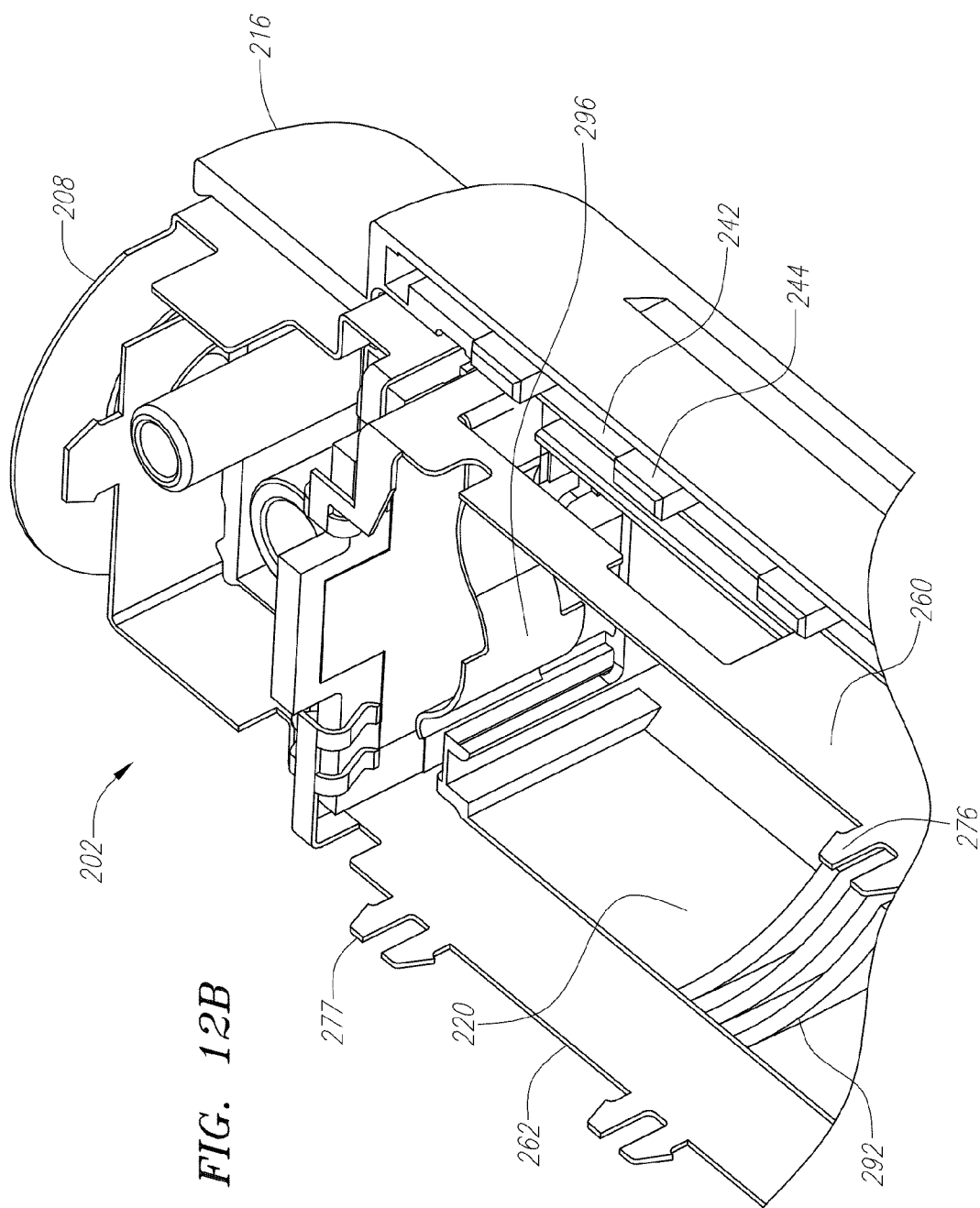

BATTERY PACK ASSEMBLIES AND PORTABLE LIGHTING DEVICES EMPLOYING SAME

TECHNICAL FIELD

The present invention relates to battery pack assemblies and portable lighting devices, including flashlights and headlamps, employing same.

BACKGROUND

Various hand held or portable lighting devices, including flashlights, are known in the art. Flashlights typically include one or more dry cell batteries having positive and negative electrodes. In certain flashlights, the batteries are arranged in series in a battery compartment of the flashlight barrel or housing.

An electrical circuit is frequently formed between the batteries and light source, such as a lamp bulb, as follows. A battery electrode through conductive means is electrically coupled to an electrode of a lamp bulb. After passing through the lamp bulb, the electrical circuit continues through a second electrode of the lamp bulb which is in electrical contact with a conductive means that is in turn in electrical contact with the other electrode of the battery. Typically, the circuit includes a switch to open or close the circuit. Actuation of the switch to close the electrical circuit enables current to pass through the lamp bulb thereby generating light.

Rechargeable flashlights may include recharging rings that are located on the exterior of the flashlight and that are electrically coupled to the rechargeable batteries therein. To recharge the batteries in such flashlights, the flashlight may be placed in a recharging cradle so that the exterior recharging rings are electrically coupled to the cradle.

Some manufacturers arrange the rechargeable batteries in series within a plastic wrap to form a battery pack that is installed within the flashlight. Nickel-cadmium (NiCd) batteries have been used in such rechargeable battery packs. However, NiCd batteries have been banned from use in certain countries due to their impact on the environment. Indeed, NiCd batteries can no longer be sold in Europe, and this prohibition will soon exist in the United States.

Accordingly, an alternate to the NiCd battery is required for future flashlights. And in order to continue using flashlights originally equipped with NiCd battery packs, a replacement battery pack with other types of batteries or battery chemistry is needed.

The nickel-metal hydride (NiMH) battery and the lithium-ion battery (Li-Ion) are both suitable replacements in that they do not create the same environmental issues as do NiCd battery packs. Furthermore, the NiMH battery provides increased capacity over a similarly sized NiCd battery, while the Li-Ion battery provides a higher volumetric energy density than that of a NiCd battery. However, issues may arise regarding the compatibility of these alternate battery packs with charging cradles or other devices originally designed to charge NiCd battery packs.

Certain NiCd battery packs may include five 2.2 Ah NiCd cells connected in series. The nominal voltage of this battery pack is 6.0V. The charger for such a battery pack may use a constant current charging scheme with a charging rate set to C/10, where C is the capacity of the batteries. Since the capacity of this battery pack is 2.2 Ah, the flashlight is configured to charge at 0.220 Amps (or 220 mA). This C/10 scheme is known as "standard charge" and generally takes fifteen hours to charge a fully depleted NiCd battery pack.

After fifteen hours, the charger may be switched from this "standard charge" C/10 scheme to a C/20 charge rate for an indefinite period of time (until the flashlight is removed). The C/20 scheme is also known as a trickle charge rate. However, the switch from the C/10 scheme to the C/20 scheme is not required with NiCd batteries and the circuit design is simplified if the charge rate is kept at C/10.

When NiMH batteries are being charged, however, charging at C/10 will overcharge the NiMH batteries after about 15 hours of charge. Accordingly, a trickle charge and the associated circuitry are necessary to replenish the self discharge of NiMH batteries.

A flashlight that may perform multiple functions beyond providing a steady stream of light has also become desirable. Indeed, the functions performed by a flashlight, such as an SOS blinking function, may sometimes become a life-saving means. However, any functions performed by the flashlight are typically built in to the flashlight at the time it is manufactured, and are not added by a user later on. Accordingly, if a user desires a flashlight having multiple functions, the user must buy the flashlight with such functions already built in. As a result, users may discard existing flashlights that do not perform multiple functions and buy new flashlights that do perform such functions. However, where such discarded flashlights contain NiCd battery packs, environmental issues arise.

In view of the foregoing, a need exists for a rechargeable battery pack that does not create the same environmental issues like NiCd batteries. A need also exists for such a battery pack to use a charging scheme that is compatible with a previously existing flashlight into which it is installed. A need also exists for such a battery pack to provide multiple functions when installed into a previously existing flashlight incapable of providing such functions. A need also exists for an improved apparatus to hold batteries in a battery pack.

SUMMARY OF THE INVENTION

It is an object of the present invention to address or at least ameliorate one or more of the problems associated with the flashlights noted above.

In an aspect of the invention, a battery pack is described that includes a battery that does not raise the environmental issues associated with NiCd batteries.

In another aspect of the invention, a battery pack is described that includes an environmentally friendly battery and that may be used with existing flashlights and charging devices originally designed for use with NiCd batteries. To this end, a battery pack is described that may convert a charging scheme from within the battery pack.

In another aspect of the invention, a battery pack is described that provides information, such as cell temperature, to allow the battery pack to be charged in alternate chargers, such as fast chargers.

In another aspect of the invention, a battery pack is described that provides multiple flashlight functions from within the battery pack and that may be used with existing flashlights not previously providing such functions.

In another aspect of the invention, a battery pack is described that includes a printed circuit board that performs different functions including a battery protection function.

In another aspect of the invention, a battery pack assembly for use in a lighting device is described. The battery pack assembly has a negative conductive end, a positive conductive end and a cylindrically shaped housing having a base and a cover. The base has a front end, a rear end and a chamber including a curved part and two flat sides. The cover has a front end, a rear end and a chamber including a curved part and two flat sides. The sides of the chamber of the base have a plurality of aligned inner slots and a plurality of alternately aligned outer slots and tabs. The sides of the chamber of the cover have a plurality of aligned inner slots and a plurality of alternately aligned outer slots and tabs. The alternately aligned outer slots and tabs of the base and the cover are offset such that when the cover and the base are joined together, a plurality of mechanical locks are formed. In the cylindrically shaped housing, there is a movable positive contact bracket and a movable negative contact bracket. The positive contact bracket includes the positive conductive end coupled to the positive end of the battery pack. The positive contact bracket has a plurality of tabs plugged into the aligned inner slots of both the base and the cover. The negative contact bracket includes the negative conductive end. The negative contact bracket has a contact spring coupled to the negative end of the battery pack. The negative contact bracket has a plurality of tabs plugged into the aligned inner slots of both the base and the cover. In the cylindrically shaped housing, there is also a printed circuit board. The printed circuit board is coupled to the positive conductive end and the negative conductive end to provide multiple functions to the flashlight and/or allow the battery pack to be recharged.

In one embodiment, the printed circuit board includes a battery protection circuit.

In one embodiment, the battery pack includes a plurality of batteries connected in series. In a further embodiment, the plurality of batteries may be NiMH batteries.

In one embodiment, the chambers of the base and the cover have a plurality of spacers positioned on the curved part, and the outer radius of the battery pack contacts only with the inner face of the spacers and the inner wall of the flat sides of the chambers.

In one embodiment, the positive contact bracket includes a guider to facilitate insertion of the battery pack.

In one embodiment, the base of the cylindrically shaped housing further has a front battery stop on the front end and a rear battery stop on the rear end. The front and rear battery stops limit the movement of the battery pack in the longitudinal direction so that the contact spring of the negative and positive contact brackets are not overly bent.

In one embodiment, the base of the cylindrically shaped housing further has a sliding spring ramp on the rear end. The sliding spring ramp provides extra space for the end of the negative spring to provide a tolerance for the length of the battery pack.

In one embodiment, the printed circuit board is installed in the rear end. In a further embodiment, the negative contact bracket has a locator to hold and contact the printed circuit board.

In another aspect of the invention, a battery pack assembly for use in a lighting device is described. The battery pack assembly has a negative conductive end, a cylindrically shaped housing, a plurality of batteries, a positive contact bracket, a negative contact bracket and a printed circuit board. The cylindrically shaped housing has a base and a cover. The base has a front end, a rear end and a plurality of chambers having a positive end, a negative end, a curved part and two flat sides. The cover has a front end, a rear end and a plurality of chambers having a positive end, a negative end, a curved part and two flat sides. The sides of the plurality of chambers of the base have a plurality of aligned inner slots and a plurality of alternately aligned outer slots and tabs. The sides of the plurality of chambers of the cover has a plurality of aligned inner slots and a plurality of alternately aligned outer slots and tabs. The alternately aligned outer slots and tabs of the base and the cover are offset such that when the cover and the base are joined together, a plurality of mechanical locks are formed. A plurality of batteries may be inserted in the plurality of chambers. Each battery has a positive end and a negative end with the positive end of the battery directed to the positive end of the chamber. The positive contact bracket has a positive conductive end coupled to the positive end of each battery. The positive contact bracket has a plurality of tabs plugged into the aligned inner slots of both the base and the cover. The negative contact bracket coupled to the negative conductive end has a plurality of contact springs coupled to the negative ends of the batteries. The negative contact bracket has a plurality of tabs plugged into the aligned inner slots of both the base and the cover. The printed circuit board is installed in the cylindrically shaped housing and is coupled to the positive conductive end and the negative conductive end.

In one embodiment, the plurality of batteries may be Li-Ion batteries.

In one embodiment, each chamber can have a plurality of spacers positioned on the curved part and the flat sides. The outer radius of the battery pack contacts only with the spacers.

In one embodiment, the positive contact bracket has a plurality of guiders to ease the insertion of the batteries.

In one embodiment, the printed circuit board is installed in the front end. In a further embodiment, the negative contact bracket has a locator to hold and contact the printed circuit board.

In another aspect of the invention, a battery pack assembly for use in a lighting device is described. The battery pack assembly has a positive conductive end, a negative conductive end, a battery pack having a positive end and a negative end, a cylindrically shaped housing for holding the battery pack and a printed circuit board. The printed circuit board may be installed in the cylindrically shaped housing. The printed circuit board can have a positive contact and a negative contact. The positive contact of the printed circuit board can be coupled to the positive end of the battery pack and the positive conductive end. The negative contact of the printed circuit board can be coupled to the negative end of the battery pack and the negative conductive end.

In another aspect of the invention, a rechargeable flashlight is described. The rechargeable flashlight has a light source, a reflector that reflects light emitted from the light source, a cylindrically shaped battery pack assembly coupled to the light source and a hollow cylindrical barrel for holding the battery pack assembly therein. The battery pack assembly can have a source of energy and a printed circuit board.

In one embodiment, the source of energy may be a plurality of NiMH batteries connected in series. In another embodiment, the source of energy may be a plurality of Li-Ion batteries connected in parallel.

In another aspect of the invention, a rechargeable flashlight is described. The rechargeable flashlight has a switch, a light source, a reflector that reflects light emitted from the light source and a cylindrically shaped battery pack assembly. The cylindrically shaped battery pack assembly has a source of energy and a printed circuit board coupled to the light source. The printed circuit board regulates current flow through the light source to perform at least two modes of operation.

In one embodiment, the printed circuit board provides battery protection.

In one embodiment, the modes of operation are performed by toggling the switch. In one embodiment, one mode of operation is a power save mode.

Further aspects, objects, desirable features and advantages of the invention are described in the following description and accompanying drawings in which various embodiments of the invention are illustrated. It is to be expressly understood, however, that the drawings are for the purpose of illustration only and are not intended as a definition of the limits of the invention.

BRIEF DESCRIPTION OF THE DRAWINGS

FIG. 6A is a top view of a positive contact bracket.
FIG. 6B is a front view of the positive contact bracket of FIG. 6A.
FIG. 6C is a left-side view of the positive contact bracket of FIG. 6A.
FIG. 6D is a detailed view near the positive conductive end of the positive contact bracket of FIG. 6A.
FIG. 12B is an enlarged perspective view of the base of the battery pack assembly of FIG. 9 show from a different angle.

DESCRIPTION OF PREFERRED EMBODIMENTS

Figure 1A:
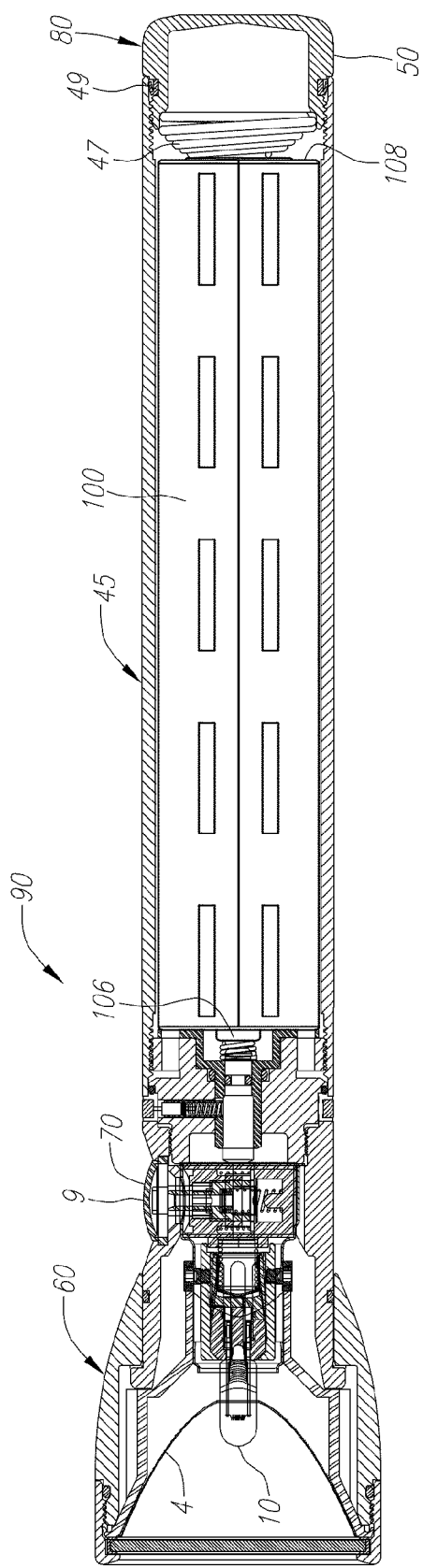
FIG. 1A is a cross-sectional view of a flashlight according to one embodiment of the present invention.

The invention is now described below with reference to the figures. The same or similar components appearing in more than one figure are assigned the same or similar reference numerals.

Figure 1B:
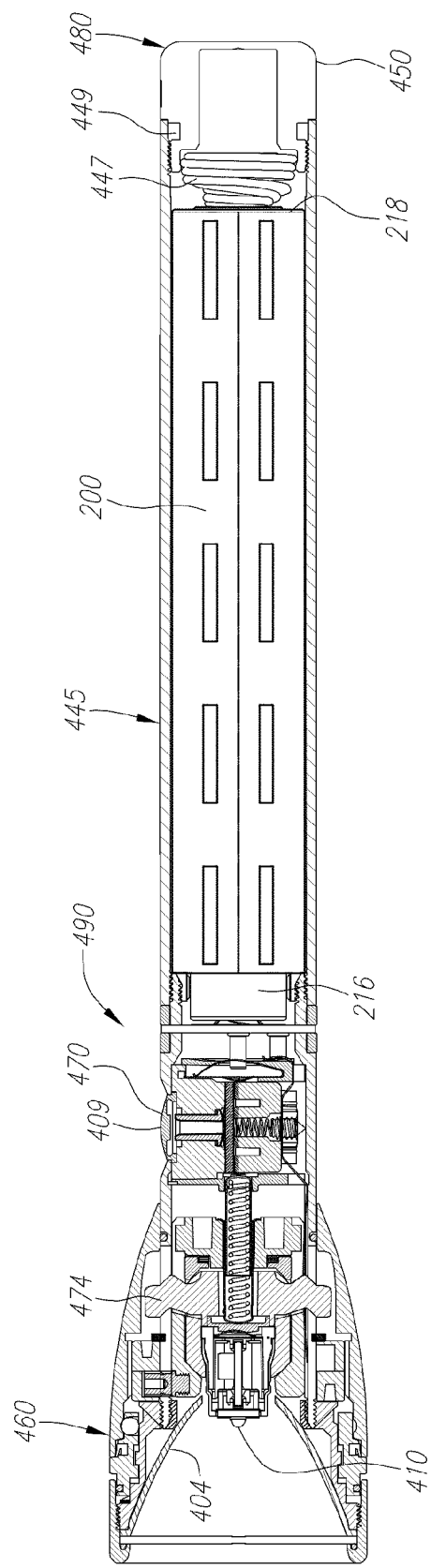
FIG. 1B is a cross-sectional view of a flashlight according to another embodiment of the present invention.

Exemplary embodiments of the flashlights 90, 490 of the present invention are shown in FIGS. 1A-1B, respectively. The flashlights 90, 490 may incorporate a number of distinct aspects of the present invention. However, it will be appreciated by one skilled in the art that the present invention is not restricted to flashlights 90, 490 as specifically described herein or illustrated in the figures. Rather, the present invention is directed to each of the inventive features of the flashlights 90, 490 described below individually as well as collectively. Further, as will be apparent to those skilled in the art after reviewing the present disclosure, one or more aspects of the present invention may also be incorporated into other electronic devices, including cell phones, portable radios, toys, as well as other portable and non-portable lighting devices.

Referring to FIG. 1A, the flashlight 90 generally includes a head assembly 60, a switch assembly 70, a barrel 45, and a tail cap assembly 80. The head assembly 60 may be located at the forward end of the barrel 45. The tail cap assembly 80 may be located at the aft end of the barrel 45.

A light source 10 may be placed within the head assembly 60. The barrel 45 may be a hollow structure suitable for housing at least one source of energy. Preferably, a battery pack assembly 100 is disposed in the battery compartment of the barrel 45. The battery pack assembly 100 may include a positive conductive end 106 in proximity to the switch assembly 70, and a negative conductive end 108 adjacent to the tail cap assembly 80. It will be appreciated by those skilled in the art that barrel 45 may be configured to include a single battery, two batteries, a plurality of three or more batteries or other suitable portable source of energy in either a series or a parallel arrangement. In a preferred embodiment, the battery pack assembly 100 contains NiMH rechargeable batteries connected in series, though other types of batteries may be used.

The tail cap assembly 80 may include a tail cap 50 and a conductive spring member 47. The tail cap 50 preferably includes a region of external threads for engaging the matching aft threads formed on the interior of the barrel 45. Those skilled in the art will recognize that other suitable means may be employed for attaching the tail cap 50 to the barrel 45.

A sealing element 49 may be provided at the interface between the tail cap 50 and the barrel 45 to provide a watertight seal. The sealing element 49 may be an O-ring or other suitable sealing device. In a preferred embodiment, the sealing element 49 is a one-way valve, such as a lip seal, that is orientated so as to prevent flow from the outside into the interior of the flashlight 45, while simultaneously allowing overpressure within the flashlight to escape or vent to the atmosphere. The design and use of one-way valves in flashlights are more fully described in U.S. Pat. Nos. 5,003,440 and 7,320,530, both issued to Anthony Maglica, and both of which are incorporated herein by reference in their entireties.

The conductive spring member 47 may form an electrical path between the negative conductive end 108 of the battery pack assembly 100 and the tail cap 50. An electrical path may be further formed between the tail cap 50 and the barrel 45 through, for example, their interface and/or the mating threads. To facilitate the flow of electricity, any surface treatment, e.g., anodizing, that exists at the contact between the tail cap and barrel is preferably removed. Accordingly, in this embodiment, the tail cap 50 may comprise a conductive material such as aluminum.

Those skilled in the art will recognize that other suitable means may be employed for electrically coupling the negative conductive end 108 of the battery pack assembly 100 to the case electrode or other contact of the barrel 45. For example, a tail cap contact (not shown) may be used to electrically couple the conductive spring member 47 and the case electrode of the barrel 45. In that case, if desired, the tail cap 50 may be fabricated from a non-conductor, such as plastic or rubber.

In an alternate embodiment, a tail cap insert may be used to provide an electrical connection between the battery pack assembly 100 and the barrel 45. Such an insert is shown or described in U.S. Pat. No. 6,457,840 which is incorporated herein by reference in its entirety.

Regardless of the tail cap assembly embodiment employed, the spring member 47 preferably urges the battery pack assembly 100 toward the front of the flashlight 90. As a result, the positive conductive end 106 of the battery pack assembly 100 may be urged into electrical contact with the switch assembly 70.

The switch assembly 70 may be disposed about the forward end of the barrel 45 and, among other things, hold the light source 10 relative to a reflector 4. The light source 10 may include means to be electrically coupled to the battery pack, e.g., a first electrode and a second electrode. The light source 10 may be any suitable device that generates light. For example, the light source 10 may be an LED lamp, an incandescent lamp or an arc lamp. In the illustrative embodiment, the light source 10 is a bi-pin halogen lamp.

The switch assembly 70 preferably includes features to hold the light source 10. Also, among other things, the switch assembly 70 preferably includes features that facilitate closing and interrupting an electrical circuit to the light source 10. The switch assembly 70 also preferably includes features that effectively dissipate heat generated by the light source 10.

The switch assembly 70 may include a switch 9 to allow a user to control the electric current flow of the flashlight 90. When the switch 9 is on, an electrical path may be formed from the positive electrode 106 of the battery pack assembly 100 to the lamp 10, the case electrode of the barrel 45, the tail cap assembly 80 and the negative electrode 108 of the battery pack assembly 100. The design of switch assemblies in flashlights are more fully described in U.S. Pat. No. 7,188,968 issued to Anthony Maglica, which is incorporated herein by reference in its entirety.

Referring to FIG. 1B, an alternate embodiment of the flashlight 490 may include a head assembly 460, a switch assembly 470, a barrel 445, and a tail cap assembly 480. The head assembly 460 is generally located at the forward end of the barrel 445. The tail cap assembly 480 is located at the aft end of the barrel 445.

A light source 410 is placed within the head assembly 460. The barrel 445 is preferably a hollow structure suitable for housing at least one source of energy. In the illustrative embodiment, a battery pack assembly 200 is preferably disposed in the battery compartment of the barrel 445. The battery pack assembly 200 may include a front end 216 facing the switch assembly 470, and rear end 218 adjacent to the tail cap assembly 480. It will be appreciated by those skilled in the art that barrel 445 may be configured to include a single battery, two batteries, a plurality of three or more batteries or other suitable portable source of energy in either a series or a parallel arrangement. In a preferred embodiment, the battery pack assembly 200 may contain Li-Ion rechargeable batteries connected in parallel, though other types of batteries may be used.

The tail cap assembly 480 may include a tail cap 450 and a spring member 447. The tail cap 450 preferably includes a region of external threads for engaging the matching aft threads formed on the interior of the barrel 445. Those skilled in the art will recognize that other suitable means may be employed for attaching the tail cap 450 to the barrel 445.

A sealing element 449 may be provided at the interface between the tail cap 450 and the barrel 445 to provide a watertight seal.

In this embodiment, the positive and negative conductive ends or terminals of the battery pack assembly 200 are preferably located at its front end 216. The spring member 447 is preferably configured so as to urge the battery pack assembly 200 forward so that both its positive and negative conductive ends (both on the front end) make electrical contact with the appropriate portions of the flashlight 490. Accordingly, in this embodiment, the tail cap 450 may comprise a non-conductive material, such as plastic or rubber.

The light source 410 includes a first electrode and a second electrode. The light source 410 may be any suitable device that generates light. For example, the light source 410 can be an LED lamp, an incandescent lamp or an arc lamp. In the illustrative embodiment, the light source 410 is an LED lamp. An adjusting mechanism 474, among other things, adjusts the light source 410 relative to a reflector 404.

The switch assembly 470 is disposed about the forward end of the barrel 445. The switch assembly 470, among other things, preferably includes features that facilitate closing and interrupting an electrical circuit to the light source 410. The switch assembly 470 may also include features that effectively dissipate heat generated by the light source 410.

The switch assembly 470 may include a switch 409 to allow a user to control the electrical current flow of the flashlight 490. When the switch 409 is on, an electrical path may be formed from the positive electrode of the battery pack assembly 200 to the lamp 410, and the negative electrode of the battery pack assembly 200.

Figure 2:
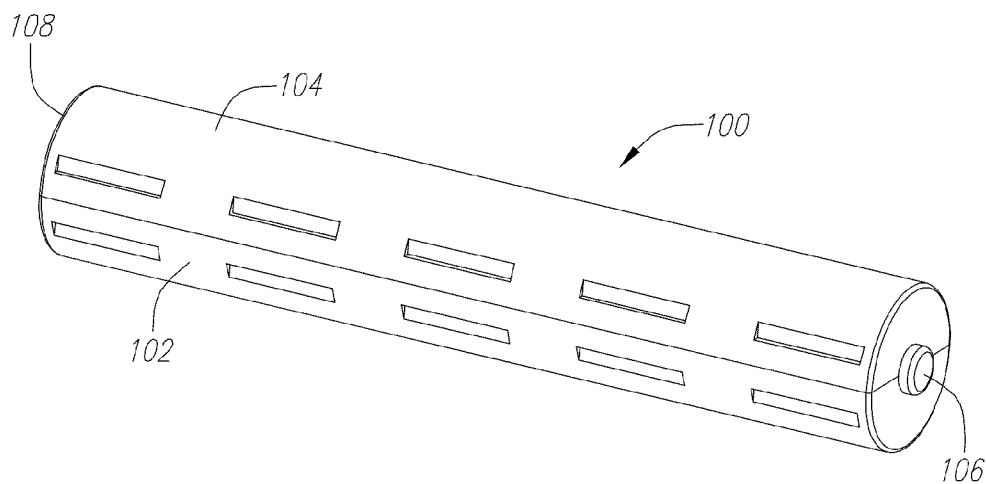
FIG. 2 is a perspective view of a battery pack assembly according to one embodiment of the present invention.

The battery pack assembly 100 is now further described with reference to FIGS. 1A and 2-8. FIG. 2 is a perspective view of an exemplary battery pack assembly 100 according to one embodiment of the present invention. As shown, the fully assembled battery pack assembly 100 may comprise a cylinder, but assembly 100 may comprise other configurations, e.g., square, rectangle, hexagon, etc. The cylindrically shaped housing may be formed by a base 102 and a cover 104. The battery pack assembly 100 may include a positive conductive end 106 and a negative conductive end 108 to provide electrical contacts. As discussed later, the positive and negative conductive ends may be on one end.

Figure 3:
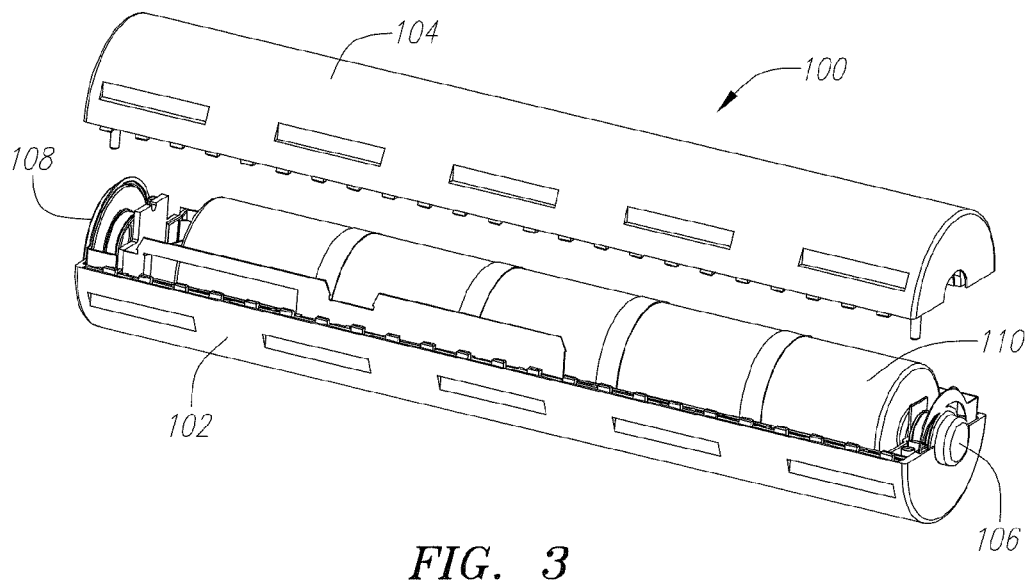
FIG. 3 is a perspective view of the battery pack assembly of FIG. 2 with the cover removed.

FIG. 3 is a perspective view of the battery pack assembly 100 of FIG. 2 with the cover 104 removed from the base 102. As shown, a battery pack 110 is preferably installed within the housing formed by the base 102 and the cover 104.

Figure 4:
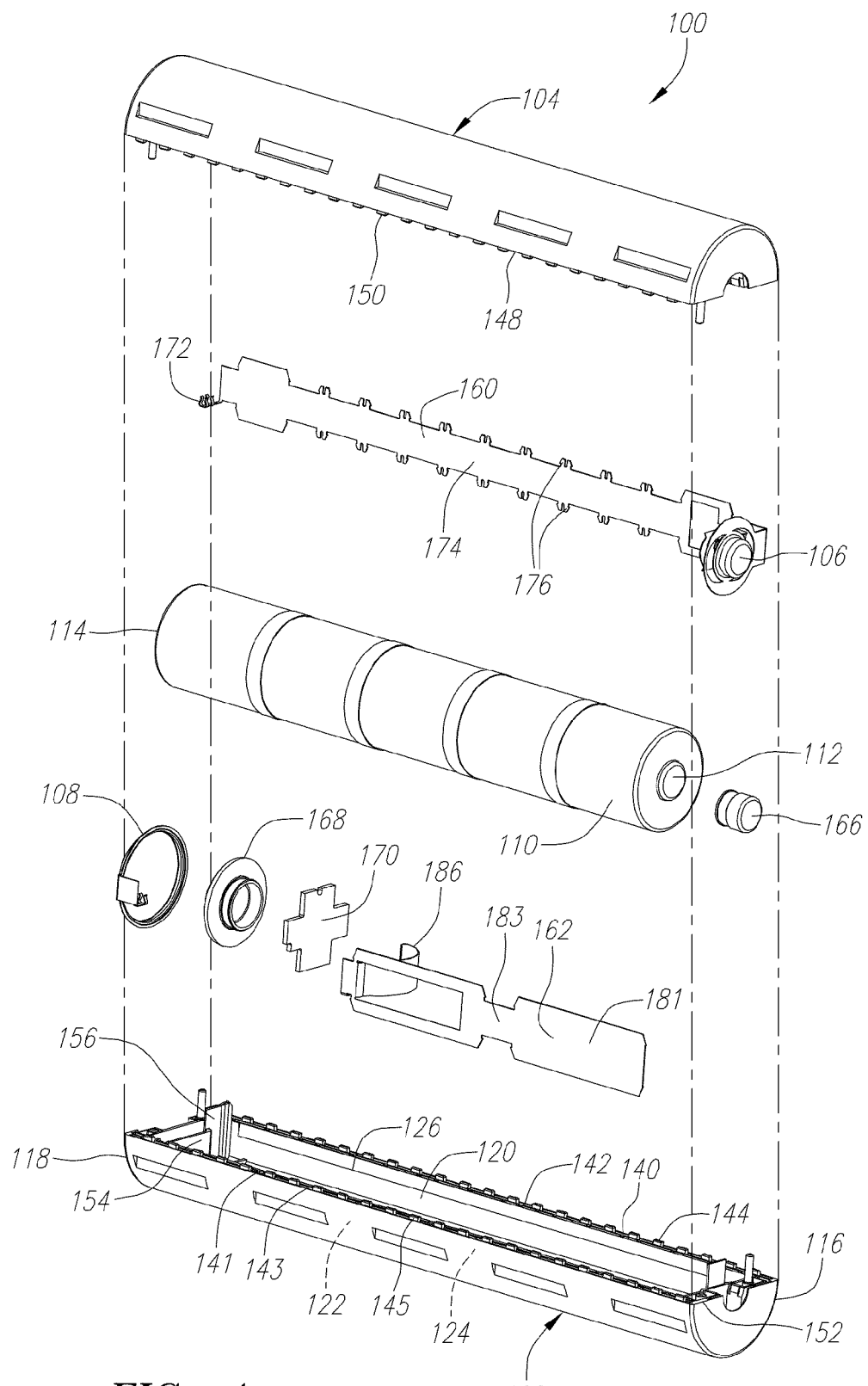
FIG. 4 is an exploded view of the battery pack assembly of FIG. 2.

FIG. 4 is an exploded view of the exemplary battery pack assembly 100 of FIG. 2. The battery pack assembly 100 may include a base 102, a cover 104, a battery pack 110, a positive contact bracket 160, a negative contact bracket 162, a negative conductive end 108, a positive end plug 166, a negative end plug 168 and a printed circuit board 170.

The battery pack 110 may include a positive electrode 112 and a negative electrode 114. The battery pack 110 may have a plurality of batteries connected in series. In a preferred embodiment, the battery pack 110 may contain five half sized D cell NiMH rechargeable batteries connected in series. This configuration provides an electric potential difference of about 6.0 volts and an electric charge of about 2.5 Ah.

Figure 5A:
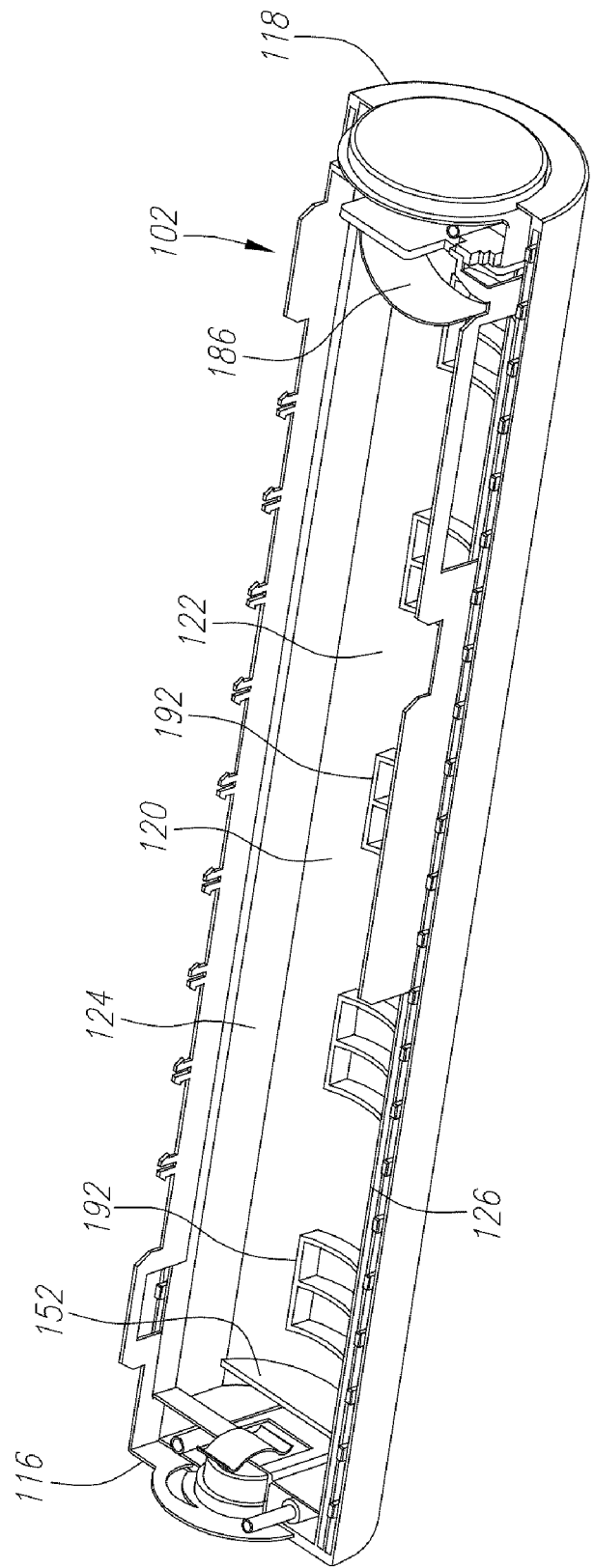
FIG. 5A is a perspective view of the base of FIG. 4.
Figure 5B:
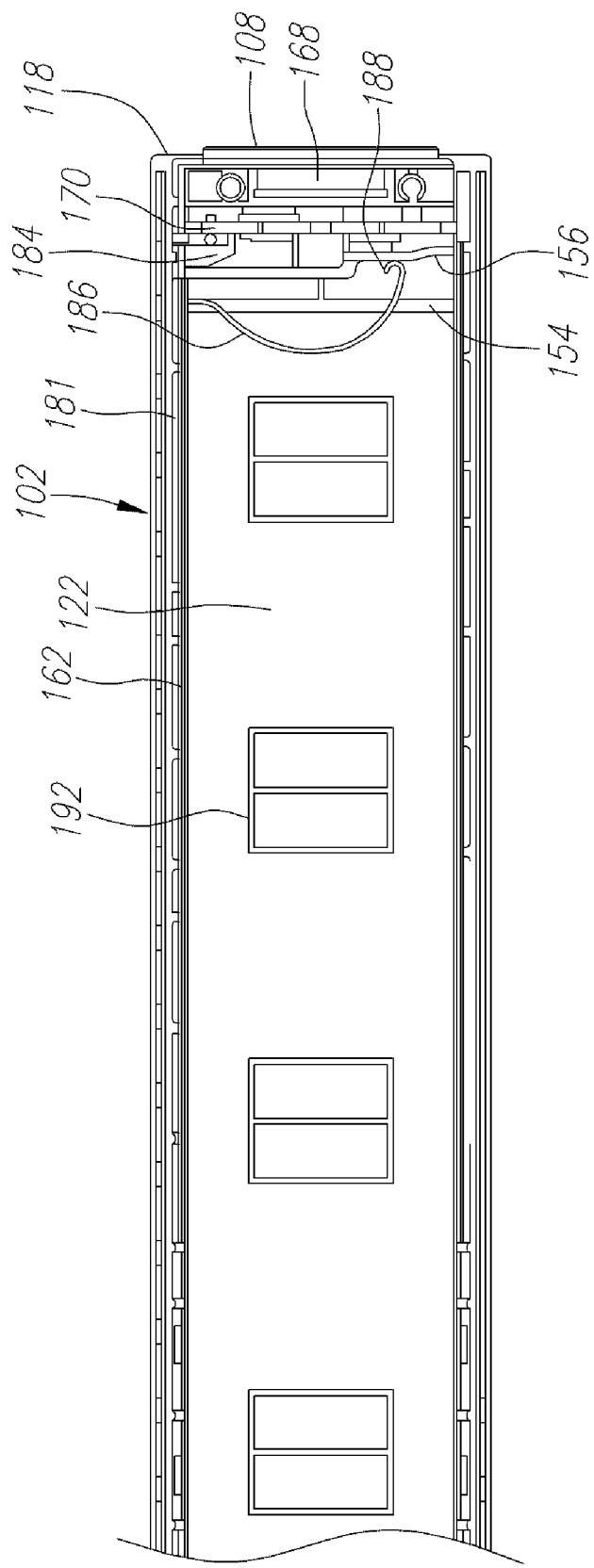
FIG. 5B is a partial top view of the base of FIG. 4.

FIG. 5A is a perspective view of the base of FIG. 4 with the battery pack 110 removed. FIG. 5B is a partial top view of the base of FIG. 4. As shown in FIGS. 4, 5A and 5B, the base 102 may include a front end 116, a rear end 118 and a chamber 120. The chamber 120 may include a curved middle portion 122 and two flat sides 124, 126. The cover 104 may also include a corresponding front end, a rear end and a chamber having a curved part and two flat sides similar to that on the base 102.

The curved portion 122 of the chamber 120 may include a plurality of spacers 192 so that when the battery pack 110 is inserted, the outer radius of the battery pack 110 preferably contacts only with the inner face of the spacers and the inner wall of the flat sides 124, 126.

The base 102 has a front battery stop 152 adjacent the front end 116 and a rear battery stop 154 adjacent the rear end 118. The front and rear battery stops 152, 154 preferably limit the movement of the battery pack 110 in the longitudinal direction by holding the front and rear shoulders or ends of the battery pack 110. In this manner, the contact spring 186 of the negative contact bracket 162 is preferably not overly bent by longitudinal movement of the battery pack 110 within the flashlight 90, if the flashlight 90 is shaken or moved longitudinally. In the present embodiment, the cover 104 may also include corresponding front and rear battery stops (not shown).

Each of the flat sides 124, 126 may include a plurality of aligned inner slots 140, 141 and a plurality of alternately aligned outer slots 142, 143 and tabs 144, 145. Similarly, each of the flat sides of the cover 104 may include a plurality of aligned inner slots (not shown) and a plurality of alternately aligned outer slots 148 and tabs 150. The alternately aligned outer slots 143 and tabs 145 of the base 102 are preferably offset with the alternately aligned outer slots 148 and tabs 150 of the cover 104, such that when the cover 104 and the base 102 are joined together, a plurality of mechanical locks may be formed between the tabs 143 and the slots 148 and also between the tabs 150 and the slots 143. These mechanical locks preferably provide a strong spine at the joint between the cover 104 and base 102. This provides protection for the batteries and other components therein.

In one embodiment, the cover 104 and the base 102 may be fabricated from a non-conductive material, such as liquid crystal polymer (LCP). In another embodiment, the cover 104 and the base 102 may be fabricated from a glass fiber reinforced material such as polyarylamide, e.g., IXEF polyarylamide. Such materials provide strength for the joined base 102 and cover 104 to protect the components therein. Furthermore, polyarylamide materials may be formed in thin cross-sections.

Referring back to FIG. 4, the positive contact bracket 160 may include a positive conductive end 106, a tail or printed circuit board clip 172 and a stripe 174. The top and bottom of the stripe 174 may each include a plurality of tabs 176. These tabs 176 may be plugged into the aligned inner slots 140 of the base 102 and the cover 104 to mechanically lock the positive contact bracket 160 with the base 102 and also with the cover 104.

The negative contact bracket 162 may include a contact spring 186 and a stripe 181. The stripe 181 may include a taper portion 183 so that the stripe 181 may be plugged into the aligned inner slots 141 of the base 102 and also in the cover 104 to mechanically lock the negative contact bracket 162 with the base 102 and the cover 104.

The positive and negative contact brackets 260, 262 may also bolster the strength and structural integrity of battery pack assembly 100 through their engagement with the base 102 and cover 104. This in turn helps protect the contents therein.

Referring to FIG. 5B, the base 102 may include a sliding spring ramp 156 near the rear end 118 and adjacent the rear battery stop 154. The sliding spring ramp 156 preferably provides a surface on which the end 188 of the contact spring 186 may travel. In this manner, when a shorter battery pack 110 is installed, the contact spring 186 may slide along ramp 156 and assume a sharper degree of curve so that the end 188 is closer to the stripe 181 of the negative contact bracket 162. Conversely, when a longer battery pack 110 is installed, the contact spring 186 may slide along ramp 156 and assume flatter configuration due to the pressure of the battery pack 110 so that the end 188 is further away from the stripe 181 of the negative contact bracket 162. This flexibility preferably allows the battery pack assembly 100 to accommodate a tolerance in the length of the battery pack 110. In the present embodiment, a (+/−) 1/16 inches of tolerance on the length of the battery pack 110 is preferred though other tolerances may be provided. In the present embodiment, the cover 104 may also include a corresponding sliding spring ramp (not shown) on the rear end to work together with the base 102.

FIG. 6A is a top view of the positive contact bracket 160. FIG. 6B is a front view of the positive contact bracket 160 of FIG. 6A. FIG. 6C is a left side view of the positive contact bracket 160 of FIG. 6A. Note that the direction of the positive contact bracket 160 in FIGS. 6A-C is opposite to that in FIG. 4. Referring to FIGS. 6A-C, the left end of the movable positive contact bracket 160 may form the positive conductive end 106 of battery pack assembly 100. The tail clip 172 may be located at the right end of the positive contact bracket 160. The top and bottom of the stripe 174 each may have a plurality of tabs 176. Near the positive conductive end 106 may be a second positive conductive end 182, that may also be formed as part of the positive contact bracket 160 and that may be electrically connected to the positive conductive end 106, the stripe 174 and the tail clip 172.

FIG. 6D is a detailed view of the second positive conductive end 182. The second positive conductive end 182 may be configured in an arch shape to help guide the positive electrode 112 of the battery pack 110 as it slides into the chamber 120 during insertion of the battery pack 110. Referring to FIGS. 4 and 6B, the non-conductive positive end plug 166 may be placed in the space between the positive conductive end 106 and the second positive conductive end 182. In the present embodiment, the positive end plug 166 may be fabricated from polyethylene, or other plastic or rubber materials, to provide cushion and spring-like support between the positive conductive end 106 and the second positive conductive end 182. The second positive conductive end 182 preferably contacts the positive electrode 112 of the battery pack 110 when the battery pack 110 is installed. The tail clip 172 may be used to engage a positive contact pad on the printed circuit board 170. In the embodiment of FIGS. 6A-D, the positive contact bracket 160 is preferably fabricated from a conductive material, such as nickel plated copper alloy 7025. However, other suitable materials may be used.

Figure 7A:
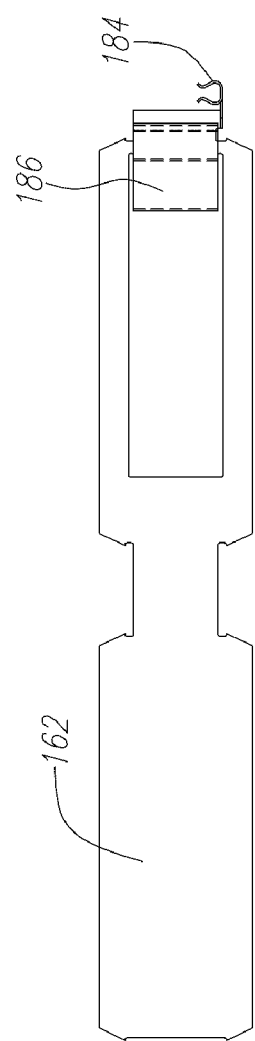
FIG. 7A is a top view of a negative contact bracket.
Figure 7B:
FIG. 7B is a front view of the negative contact bracket of FIG. 7A.

FIG. 7A is a top view of the negative contact bracket 162. FIG. 7B is a front view of the negative contact bracket 162 of FIG. 7A. Note that the direction of the negative contact bracket 162 in FIGS. 7A-7B is opposite to that in FIG. 4. The negative contact bracket 162 may include a tail or printed circuit board clip 184 at the right end and a contact spring 186 extending from the main portion of the negative contact bracket 162. The hook-shaped contact spring 186 has an end 188. The contact spring 186 preferably comprises a material with sufficient resiliency to urge the negative electrode 114 of the battery pack 110 forward when the battery pack 110 is installed in chamber 120. The tail clip 184 preferably engages a negative contact pad on the printed circuit board 170. In the embodiment of FIGS. 7A-7B, the negative contact bracket 162 is preferably fabricated from a conductor, such as nickel plated beryllium copper alloy. However, other suitable materials may be used.

Figure 8C:
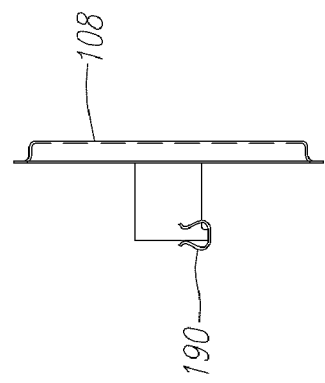
FIG. 8C is a front view of the negative conductive end of FIG. 8A.
Figure 8A:
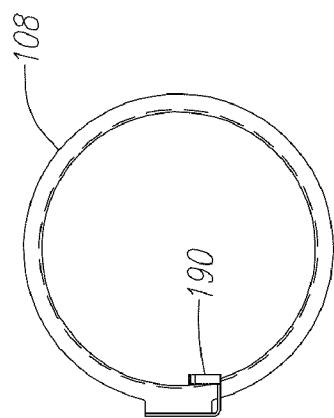
FIG. 8A is a front view of a negative conductive end.
Figure 8B:
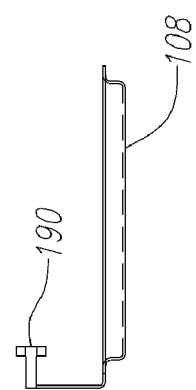
FIG. 8B is a side view of the negative conductive end of FIG. 8A.

FIG. 8A is a front view of the round-shaped negative conductive end 108 of the battery pack assembly 100. FIG. 8B is a top view of the negative conductive end 108 of FIG. 8A. FIG. 8C is a right-side view of the negative conductive end 108 of FIG. 8A. The negative conductive end 108 preferably includes a tail clip 190 to engage a negative contact pad on the printed circuit board 170. In the embodiment of FIGS. 8A-C, the negative conductive end 108 is preferably fabricated from a conductor, such as nickel plated copper alloy 7025, but other suitable materials may be used. The non-conductive negative end plug 168 may be inserted between the negative conductive end 108 and a stopper (not shown) to provide a solid but resilient cushion to the pressure from the negative conductive end 108. Accordingly, in the present embodiment, the negative end plug 168 is fabricated from polyethylene.

Referring to FIG. 4, when the battery pack assembly 100 is fully assembled, the positive electrode 112 of the battery pack 110 is electrically coupled to the positive contact bracket 160 (including the second positive conductive end 182 (not shown), the stripe 174, the positive conductive end 106 and the tail clip 172) and the positive contact pad of the printed circuit board 170. The negative electrode 114 of the battery pack 110 is electrically coupled to the negative contact bracket 162 (including the contact spring 186 and the tail clip 184 (not shown)), the negative conductive end 108 (including the tail clip 190 (not shown)) and the negative contact pad of the printed circuit board 170.

When the circuit of the flashlight is turned on, the electrical current may flow from the positive electrode 112 of the battery pack 110 to the second positive conductive end 182 (not shown) and through the stripe 174 to the positive conductive end 106. Also, the electrical current flows from the positive electrode 112 of the battery pack 110 to the second positive conductive end 182 (not shown) and through the stripe 174 to the tail clip 172 and then the positive contact pad of the printed circuit board 170.

The electrical current then passes from the positive conductive end 106 through a light bulb or other type of light source. The electrical current may then come back to the negative conductive end 108, the tail clip 190 (not shown) of the negative conductive end 108, the printed circuit board 170, the tail clip 184 (not shown) of the negative contact bracket 162, the negative contact bracket 162, the contact spring 186 (not shown) and finally, the negative electrode 114 of the battery pack 110.

Figure 9:
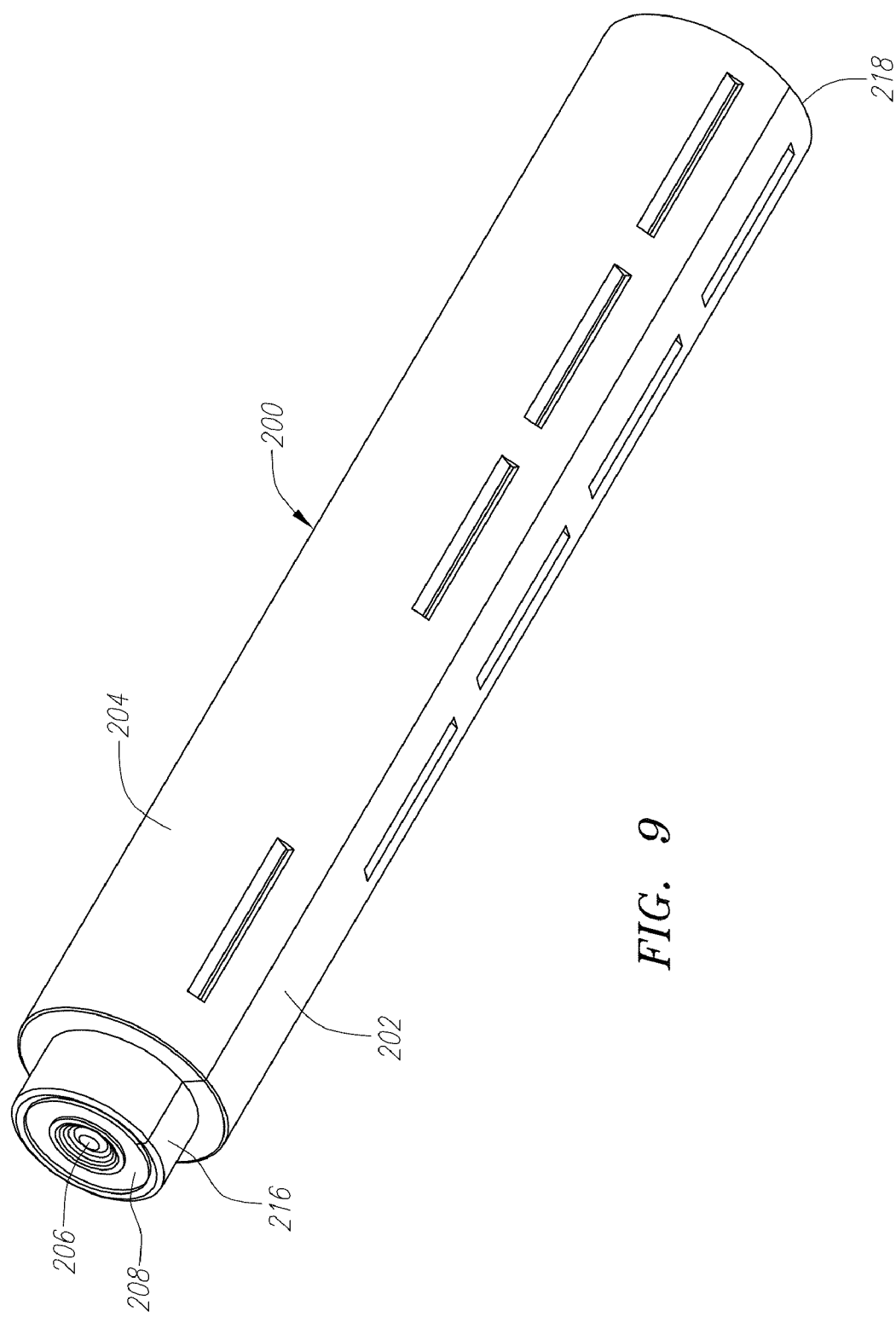
FIG. 9 is a perspective view of a battery pack assembly according to another embodiment of the present invention.
Figure 10:
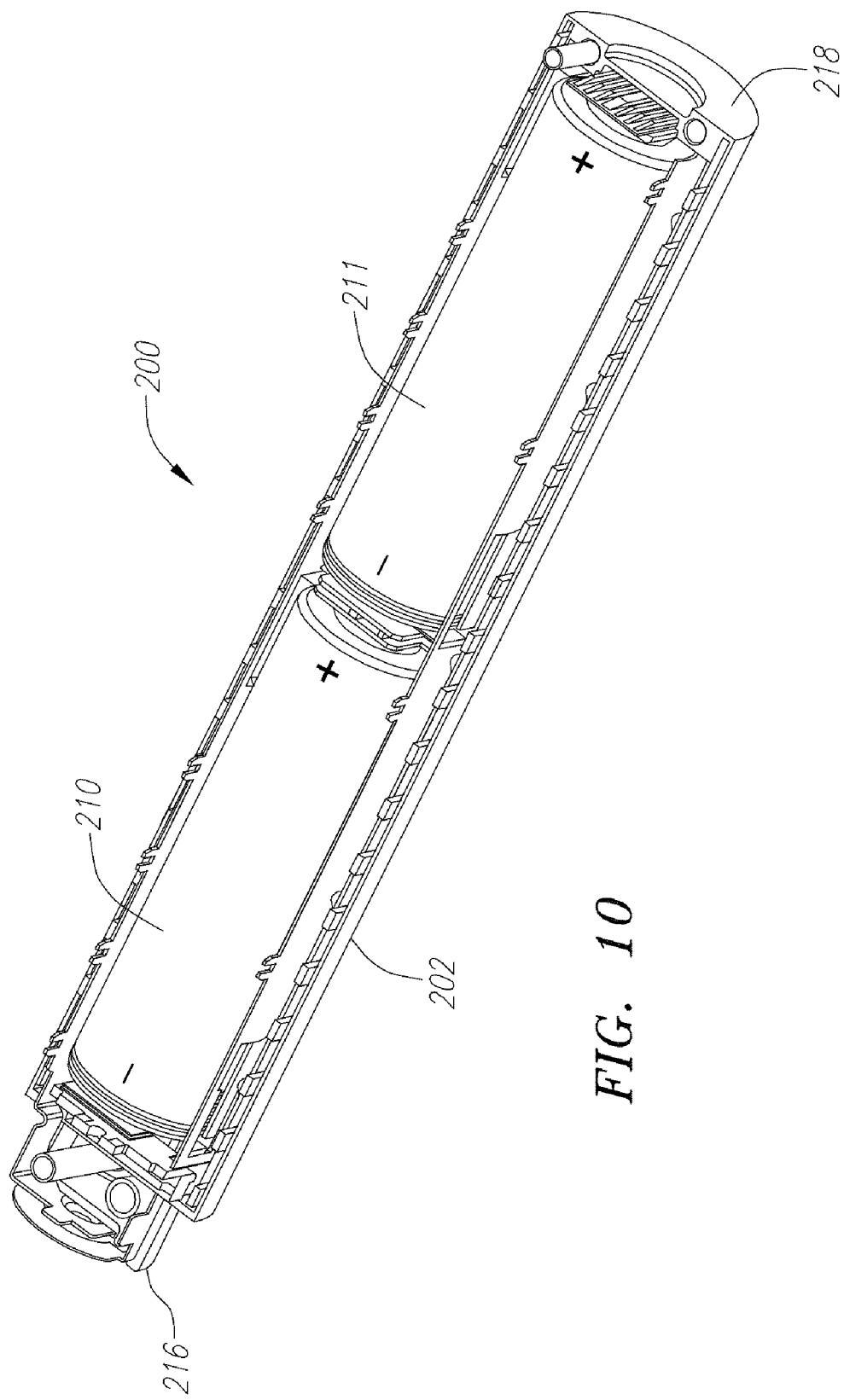
FIG. 10 is a perspective view of the battery pack assembly of FIG. 9 with the cover removed.

An alternate embodiment of the battery pack assembly 200 is now described with reference to FIGS. 1b and 9-14. FIG. 9 is a perspective view of the battery pack assembly 200. As shown, the battery pack assembly 200 may be configured as a cylindrically shaped housing formed by a base 202 and a cover 204, though other assembly 200 may comprise other shapes, e.g., square, rectangle, hexagon, etc. The battery pack assembly 200 may have a positive conductive end 206 and a negative conductive end 208 to provide electrical contacts. In this embodiment, the positive conductive end 206 and the negative conductive end 208 are preferably on the same end of the battery pack assembly 200. As shown in FIG. 9, the positive conductive end 206 may comprise a knub while the negative conductive end 208 may comprise a ring around the knub. This annular arrangement facilitates with conductive ends 206, 208 being on the same end. FIG. 10 is a perspective view of the battery pack assembly 200 of FIG. 9 with the cover 204 removed to show the batteries 210, 211 that are installed within the housing formed by the base 202 and the cover 204.

Figure 11:
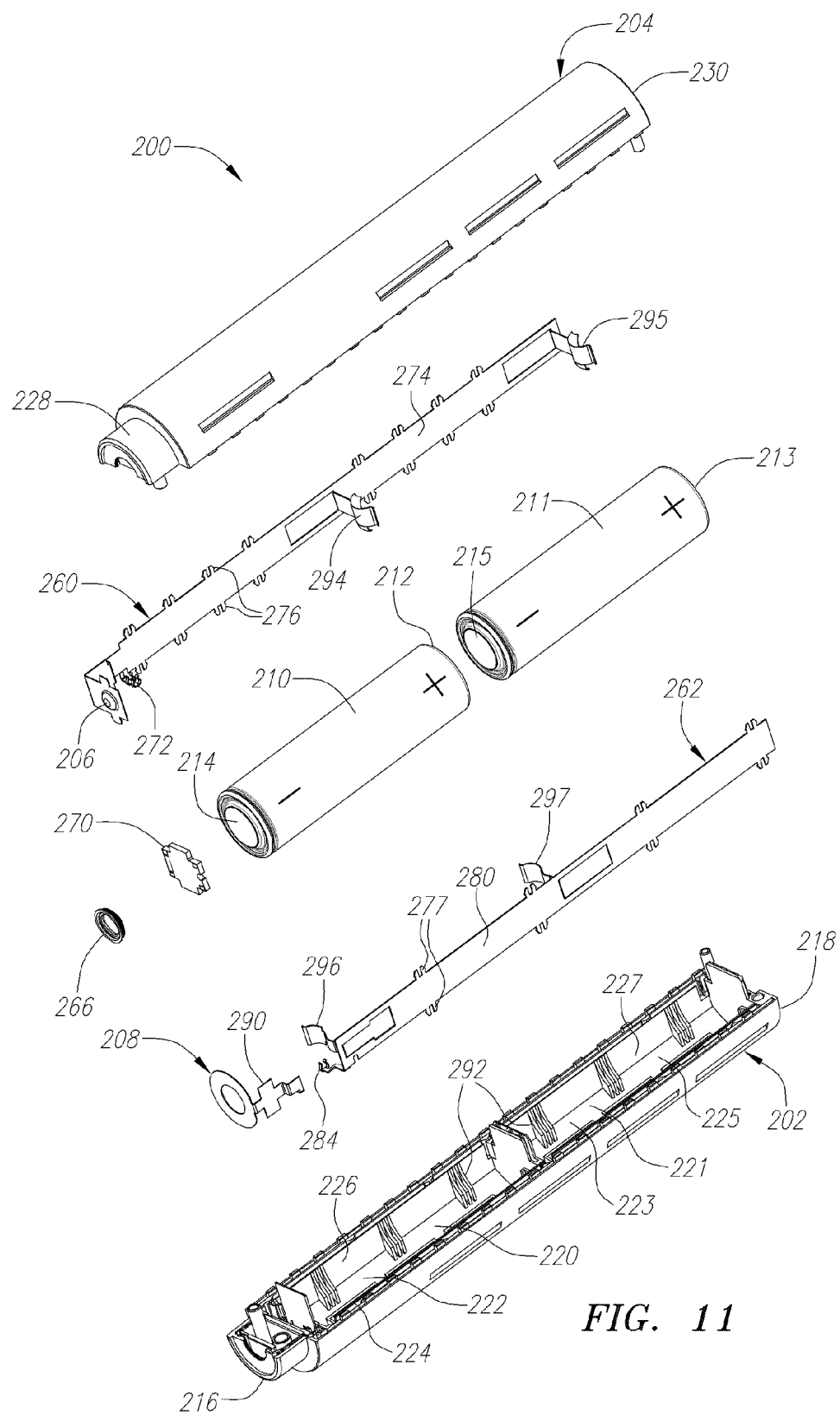
FIG. 11 is an exploded view of the battery pack assembly of FIG. 9.

FIG. 11 is an exploded view of the exemplary battery pack assembly 200 of FIG. 9. As shown, the battery pack assembly 200 may include a base 202, a cover 204, two batteries 210, 211, a positive contact bracket 260, a negative contact bracket 262, a negative conductive end 208, a positive end plug 266 and a printed circuit board 270.

The first battery 210 has a positive electrode 212 and a negative electrode 214. The second battery 211 has a positive electrode 213 and a negative electrode 215. In the present embodiment, the first battery 210 and the second battery 211 are preferably connected in parallel. This configuration provides increased current to support an LED lamp. In one embodiment, the potential difference between the positive electrode 212 and the negative electrode 214 of the first battery 210 may be 3.7 Volts and the potential difference between the positive electrode 213 and the negative electrode 215 of the second battery 211 may be 3.7 Volts. In another embodiment, a different potential difference between the positive and negative electrodes can be employed by the first battery 210 and the second battery 211.

The base 202 may include a front end 216, a rear end 218, a first chamber 220 and a second chamber 221. Each of the chambers 220, 221 may have a curved middle portion 222, 223 and two flat sides 224, 225, 226, 227. The cover 204 may also include a front end 228, a rear end 230, and two chambers each having a curved portions and two flat sides as described in the corresponding parts of the base 202.

The chambers 220, 221 may include a plurality of spacers 292 placed on curved portions 222, 223 as well as the flat sides 224, 225, 226, 227. Accordingly, the outer radius of the batteries 210, 211 preferably contacts only with the inner face of the spacers 292.

Figure 12A:
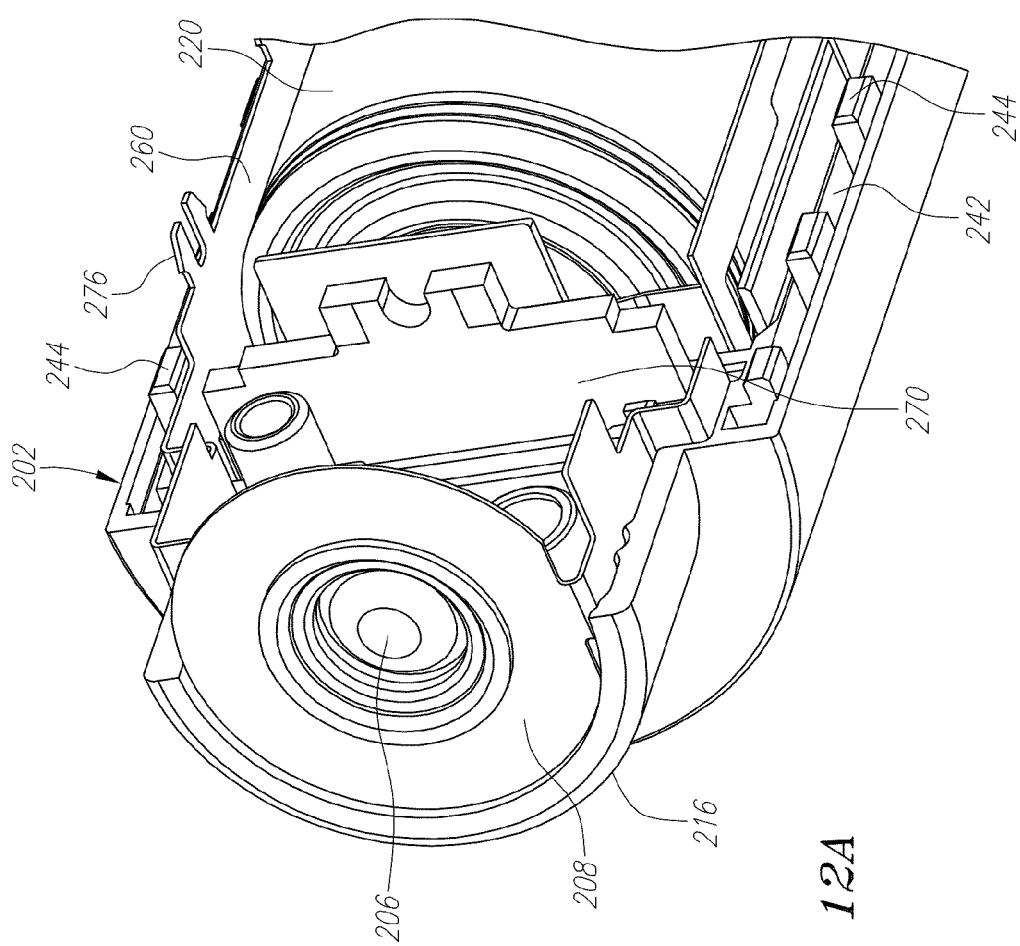
FIG. 12A is an enlarged perspective view showing the base of the battery pack assembly of FIG. 9 near the positive and negative conductive ends.
Figure 12C:
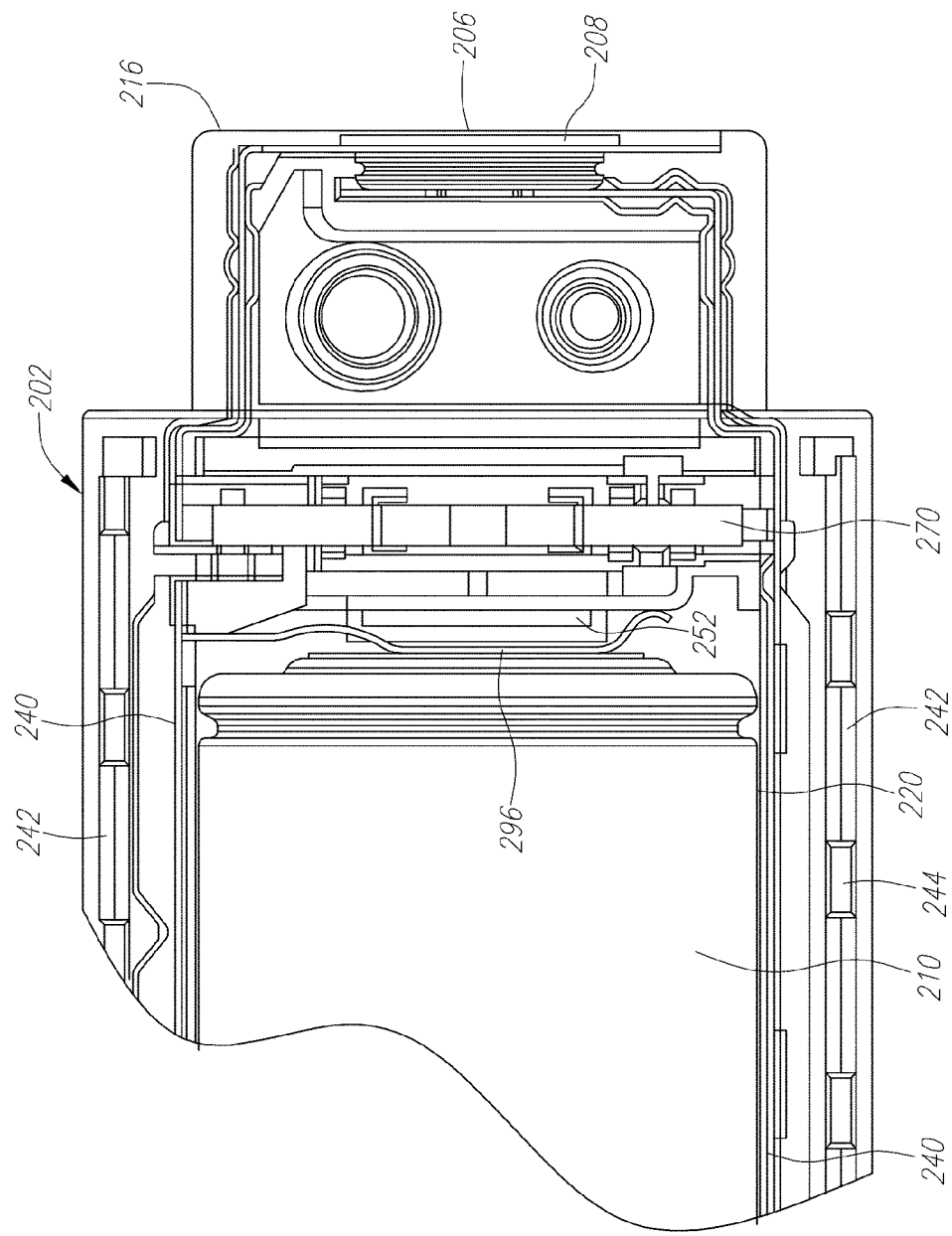
FIG. 12C is a top view of the base of the battery pack assembly of FIGS. 12A-B with a battery installed.
Figure 13:
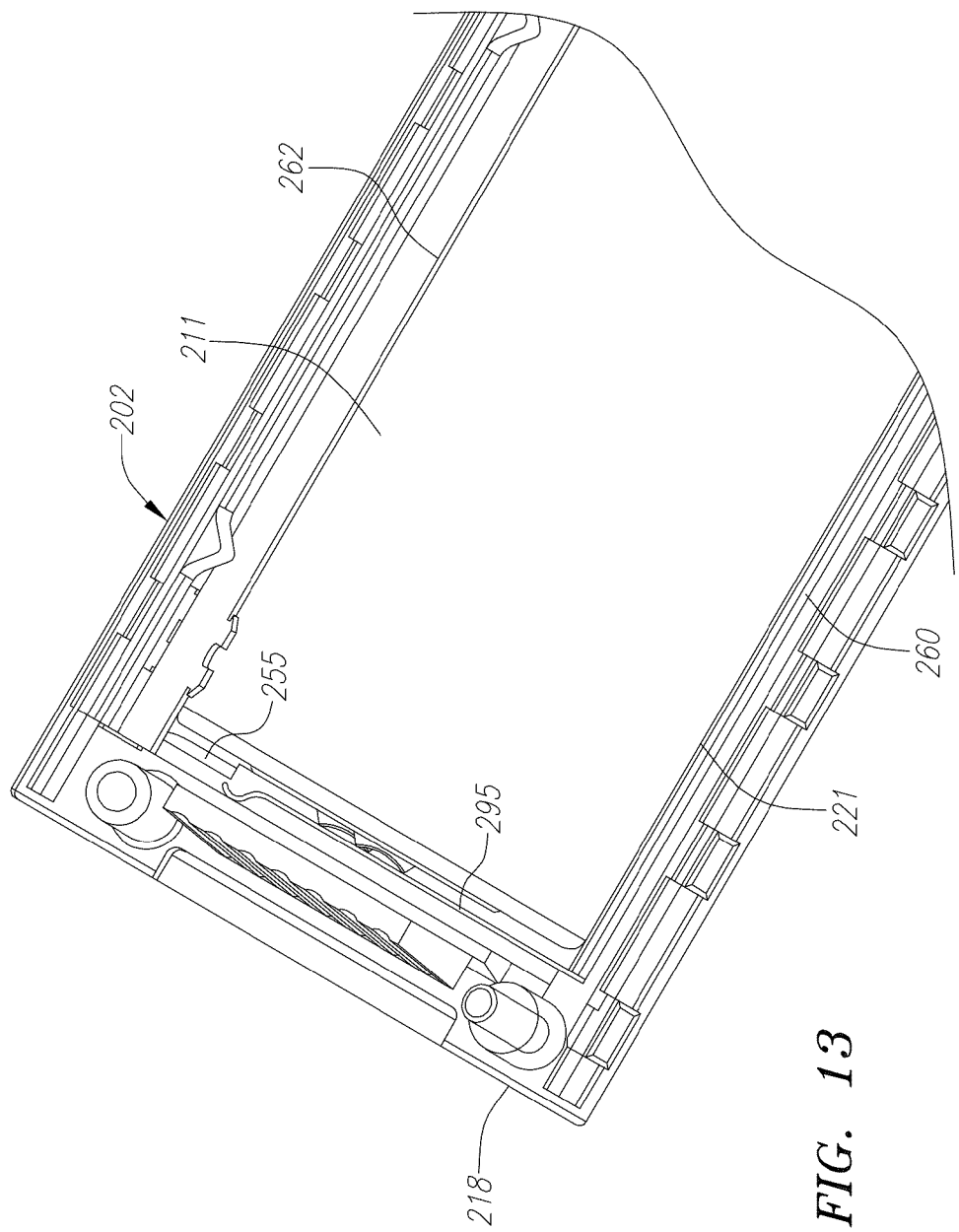
FIG. 13 is an enlarged top view of the base of the battery pack of FIG. 9 near the non-contact end with a battery installed.
Figure 14A:
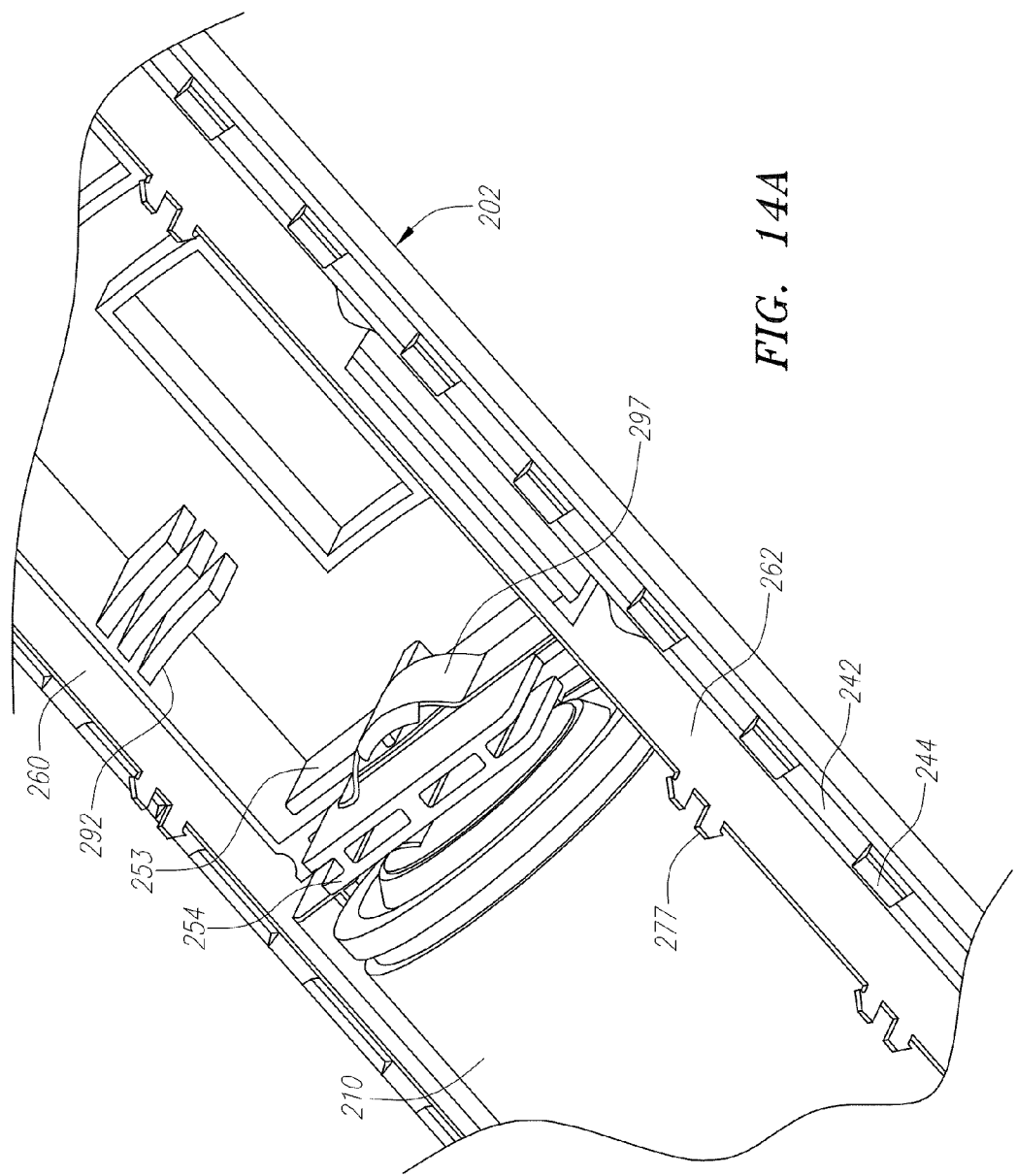
FIG. 14A is an enlarged perspective view of the base of the battery pack of FIG. 9 near the middle portion with a battery installed.
Figure 14B:
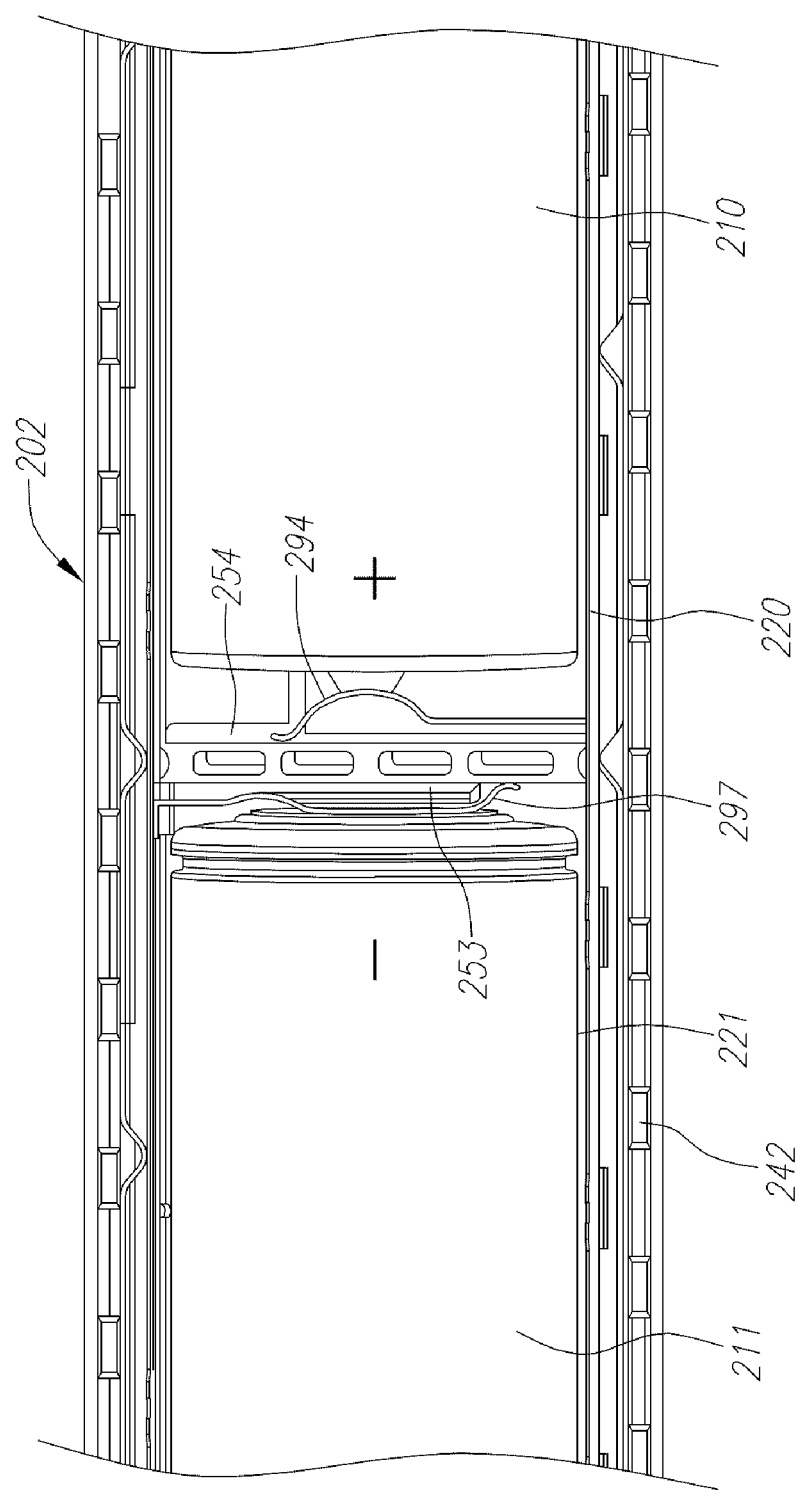
FIG. 14B is a top view of the base of the battery pack of FIG. 9 near the middle portion with batteries installed.

FIG. 12A is an enlarged perspective view showing the base 202 of the battery pack assembly 200 of FIG. 9 near the front end 216. FIG. 12B is another enlarged perspective view of the base 202 of FIG. 9 near the front end 216 shown from a different angle. FIG. 12C is a top view of the base 202 of the battery pack assembly 200 of FIGS. 12A-12B with the battery 210 installed. FIG. 13 is an enlarged top view of the base 202 of FIG. 9 near the rear end 218 with the battery 211 installed. FIG. 14A is an enlarged perspective view of the base 202 of FIG. 9 near the middle portion with the battery 210 installed. FIG. 14B is a top view of the base 202 near the middle portion with batteries 210, 211 installed.

Referring to FIGS. 12A-14B, the base 202 may include a first front battery stop 252 and a first rear battery stop 254 in the first chamber 220. The base 202 may also include a second front battery stop 253 and a second rear battery stop 255 in the second chamber 221. The front and rear battery stops 252, 253, 254, 255 preferably limit the movement of the batteries 210, 211 in the longitudinal direction. As shown in FIGS. 14A-14B, these battery stops 253, 254 in the middle of the flashlight may also help define the chambers 220, 221 and prevent the springs 294, 297 from touching others so as to maintain a parallel electrical connection between batteries 210, 211. In the present embodiment, the cover 204 may also include battery stops at the corresponding positions (not shown).

Referring to FIGS. 11, 12A-14B, each of the flat sides 224, 225, 226, 227 may include a plurality of aligned inner slots 240 and a plurality of alternately aligned outer slots 242 and tabs 244. Similarly, each of the flat sides of the cover 204 may also include a plurality of aligned inner slots and a plurality of alternately aligned outer slots and tabs (not shown). The alternately aligned outer slots 242 and tabs 244 of the base 202 are preferably offset with the alternately aligned outer slots and tabs of the cover 204 such that when the cover 204 and the base 202 are joined together, a plurality of mechanical locks are formed between the tabs of the base 202 and the slots of the cover 204 and also between the tabs of the cover 204 and the slots of the base 202. These mechanical locks preferably provide a strong spine at the joint between the cover 104 and base 102. This provides protection for the batteries and other components therein.

In one embodiment, the cover 204 and the base 202 may be fabricated from a non-conductive material, such as liquid crystal polymer (LCP). In another embodiment, the cover 204 and base 202 may comprise a polyarylamide, such as IXEF polyarylamide. Such materials provide strength for the joined base 102 and cover 104 to protect the components therein. Furthermore, polyarylamide materials may be molded in thin cross-sections.

The positive contact bracket 260 may include a positive conductive end 206, a tail or printed circuit board clip 272, two contact springs 294, 295 and a stripe 274. The top and bottom of the stripe 274 may each include a plurality of tabs 276. These tabs 276 may be plugged into the aligned inner slots 240 of the base 202 and the cover 204 to mechanically lock the positive contact bracket 260 with the base 202 and the cover 204.

The left end of the positive contact bracket 260 may comprise the positive conductive end 206 of battery pack assembly 200. The tail or printed circuit board clip 272 may be located behind the positive conductive end 206 to engage a positive contact pad on the printed circuit board 270. The first positive contact spring 294 is preferably of sufficient resiliency and is configured to urge the positive electrode 212 of the first battery 210 forward when installed in the first chamber 220. Similarly, the second positive contact spring 295 is preferably of sufficient resiliency and is configured to urge the positive electrode 213 of the second battery 211 forward when installed in the second chamber 221. The arch shape of the first and second positive contact springs 294, 295 preferably guide the positive electrodes 212, 213 as they are slid into the chambers 220, 221 during the insertion of the batteries 210, 211.

It is preferred that the positive conductive end 206, the tail clip 272, the first positive contact spring 294 and the second positive contact spring 295 are all electrically connected. Accordingly, in the embodiment of FIG. 11, the positive contact bracket 260 is preferably fabricated from a conductive material, such as nickel plated copper alloy 7025. However, other suitable materials may be used.

The negative contact bracket 262 may include two negative contact springs 296, 297 and a stripe 280. The top and bottom of the stripe 280 each may include a plurality of tabs 277. These tabs 277 may be plugged into the aligned inner slots 240 of the base 202 and the cover 204 to mechanically lock the negative contact bracket 262 with the base 202 and the cover 204.

The negative contact bracket 262 may include a tail clip 284 at the left end. A first negative contact spring 296 and a second negative contact spring 297 may extend from the conductive stripe 280 of the negative contact bracket 262. The first negative contact spring 296 preferably urges the negative electrode 214 of the first battery 210 rearward when installed in the first chamber 220. Similarly, the second negative contact springs 297 is used to urge the negative electrode 215 of the second battery 211 rearward when installed in the second chamber 221. The tail clip 284 may engage a negative contact pad on the printed circuit board 270.

It is preferred that the tail clip 284, the first negative contact spring 296, and the second negative contact spring 297 are all electrically connected. Accordingly, in the embodiment of FIG. 11, the negative contact bracket 262 is preferably fabricated from a conductor, such as nickel plated beryllium copper alloy. However, other suitable materials may be used.

The positive and negative contact brackets 260, 262 may also bolster the strength and structural integrity of battery pack assembly 200 through their engagement with the base 202 and cover 204. This in turn helps protect the contents therein.

The ring-shaped negative conductive end 208 may include a connection device 290 that may electrically connect the negative conductive end 208 and the negative contact bracket 262. In one embodiment, the negative conductive end 208 is preferably fabricated from a conductor, such as nickel plated copper alloy 7025, or other suitable material.

The ring-shaped non-conductive end plug 266 can be placed between the positive conductive end 206 and the negative conductive end 208 as an insulator and/or a buffer. In the present embodiment, the end plug 266 is fabricated from polyethylene to provide cushion between the positive conductive end 206 and the negative conductive end 208. Other suitable materials may be used.

When the battery pack assembly 200 is fully assembled, the positive electrodes 212, 213 of the batteries 210, 211 are electrically coupled to the positive contact bracket 260 (including the positive conductive end 206, the tail clip 272, the first positive contact spring 294, the second positive contact spring 295 and the stripe 274) and the positive contact pad of the printed circuit board 270. The negative electrodes 214, 215 of the batteries 210, 211 are electrically coupled to the negative contact bracket 262 (including the tail clip 284, the first negative contact spring 296 and the second negative contact spring 297), the negative conductive end 208 and the negative contact pad of the printed circuit board 270.

When the battery pack assembly 200 is installed into a battery compartment of a flashlight having the positive and negative battery contacts on the same end, the electrical current may flow from the positive electrodes 212, 213 of the batteries 210, 211, through the first and second positive contact springs 294, 295 and the stripe 274, to the positive conductive end 206. Also, the electrical current may flow from the stripe 274 to the tail clip 272 and then the positive contact pad of the printed circuit board 270. The electrical current may then pass through a light bulb or other light source of the flashlight or other lighting device, and may then return to the negative conductive end 208, the negative contact pad of the printed circuit board 270, the tail clip 284 of the negative contact bracket 262, the conductive stripe 280, the first and second contact springs 296, 297, and finally, the negative electrodes 214, 215 of the batteries 210, 211.

Figure 15:
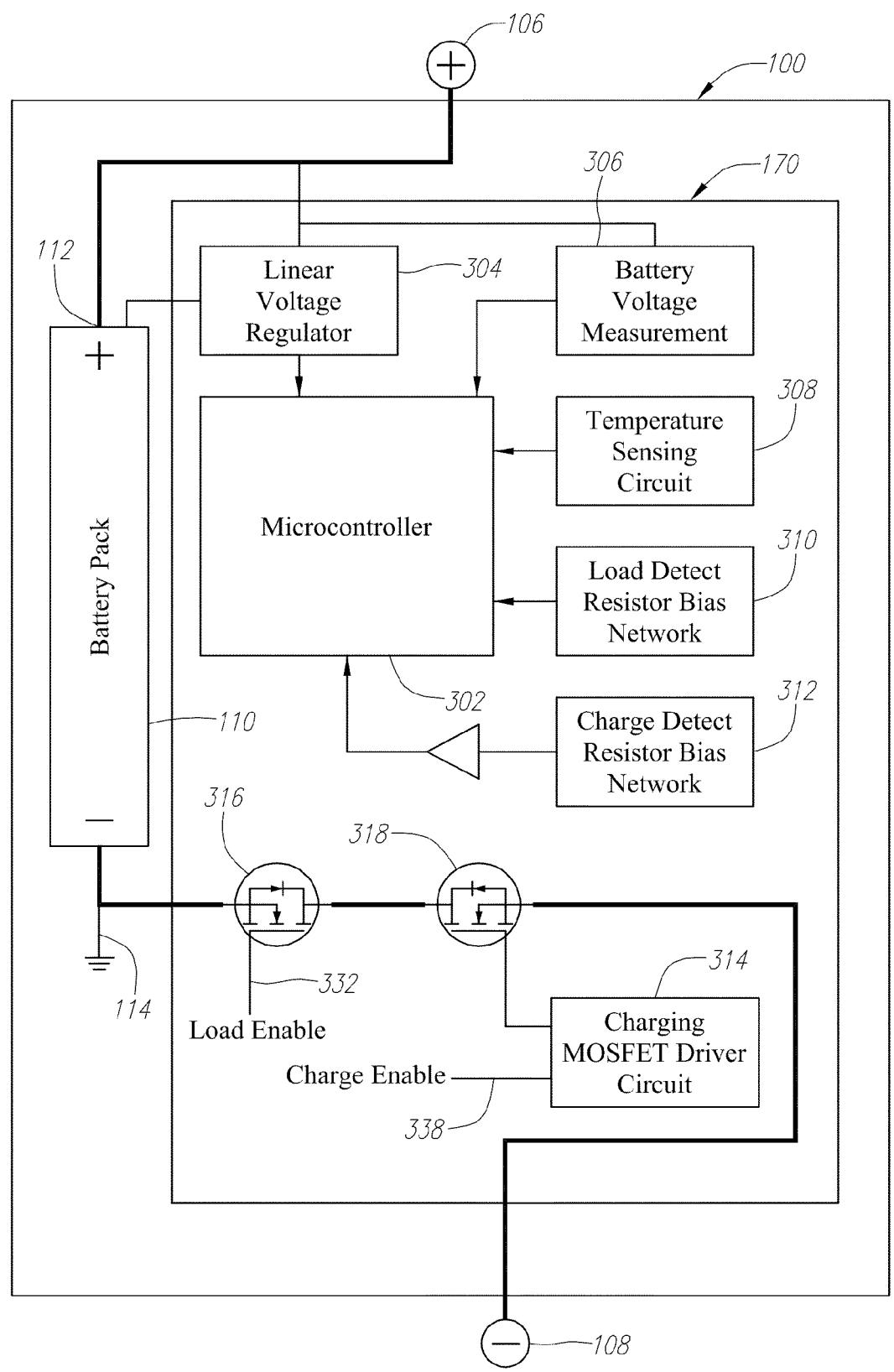
FIG. 15 is a block diagram illustrating the relationship of the electronic circuitry according to one embodiment of the invention.

The printed circuit board 170 of the battery pack assembly 100 and the associated circuits are now described with reference to FIGS. 15-16. FIG. 15 is a block diagram illustrating the relationship of the electronic circuitry of the battery pack assembly 100. The battery pack assembly 100 has a positive conductive end 106 and a negative conductive end 108 to provide an electric potential difference to an external device such as a lamp of a flashlight. The positive conductive end 106 is electrically connected to the positive electrode 112 of the battery pack 110 and the printed circuit board 170. The negative conductive end 108 is electrically connected to the printed circuit board 170. The negative electrode 114 of the battery pack 110 is electrically connected to the printed circuit board 170. In this embodiment, there is no direct connection between the negative conductive end 108 and the negative electrode 114 of the battery pack 110.

In the embodiment of FIG. 15, the printed circuit board 170 includes a microcontroller 302, a linear voltage regulator 304, a battery pack voltage measurement circuit 306, a temperature sensing circuit 308, a load detect resistor bias network 310, a charge detect resistor bias network 312, a charging MOSFET driver circuit 314, and two n-channel metal-oxide-semiconductor field-effect transistors (n-channel MOSFET, or NMOS) 316, 318.

FIGS. 16A-G are circuit schematic diagrams for the components in the printed circuit board 170 of FIG. 15.

Figure 16A:
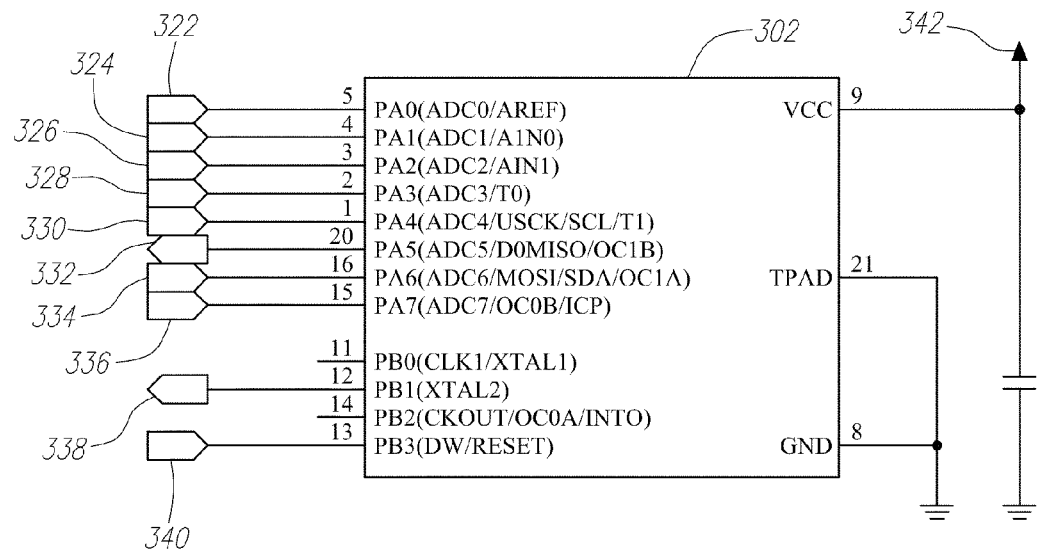
FIGS. 16A-G are circuit schematic diagrams for the components in the printed circuit board of FIG. 15.

FIG. 16A shows the microcontroller 302 and its connections. The microcontroller 302 receives input signals from input signal lines ADC_VPACK− 322, ADC_TEMP 324, ADC_VBAT 326, ADC_R_ISENSE+ 328, SCK 330, MOSI, 334, ADC_R_ISENSE− 336 and RESET 340. The microcontroller 302 delivers output signals to output signal lines LOAD_ENABLE/MISO 332 and CHARGE_ENABLE 338. In one embodiment, the microcontroller 302 is a commercial microcontroller having embedded memory, such as, for example, ATtiny24 which is an 8-bit microcontroller manufactured by Atmel Corporation of San Jose, Calif. In another embodiment, the microcontroller 302 can be a microprocessor. Yet in other embodiments, the microcontroller 302 can be discrete circuits.

Figure 16B:
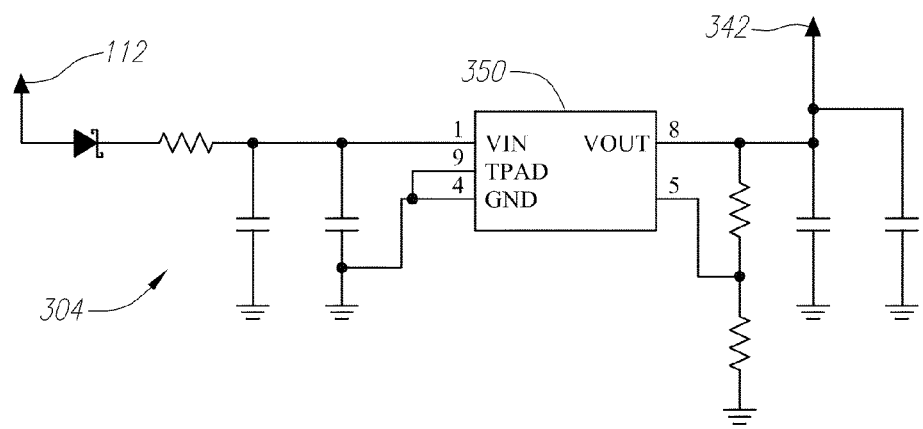

FIG. 16B shows a circuit schematic diagram of the linear voltage regulator 304. The linear voltage regulator 304 takes the voltage from the positive electrode 112 of the battery pack 110 and regulates it to a 4.0 volts DC power supply 342 to be used by the other circuit components 302, 308, 310, 312, and 314. This is important because the voltage provided by the battery pack 110 could be greater than the voltage requirement of the microcontroller 302 and other circuit components. The main component of the linear voltage regulator circuit 304 may be a linear regulator 350. The linear regulator 350 can be a commercial linear regulator, such as, for example, ST715PUR which is a high input voltage, low dropout voltage linear regulator manufactured by ST Microelectronics. In another embodiment, the linear regulator 350 can be discrete circuits.

Figure 16C:
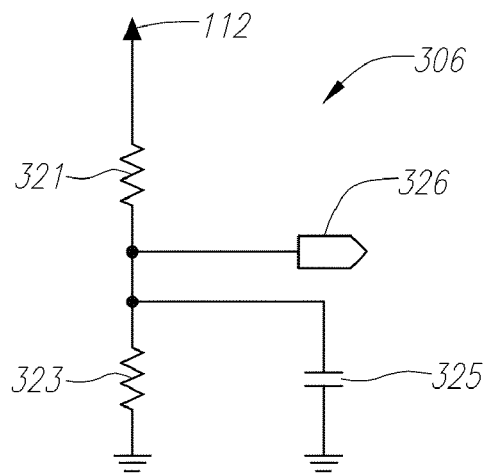

FIG. 16C is a schematic diagram of the battery voltage measurement circuit 306. The battery pack voltage measurement circuit 306 may receive the voltage from the positive electrode 112 of the battery pack 110 and divide the voltage down to a level that the analog-to-digital converter embedded in the microcontroller 302 may use. In the present embodiment, the voltage division is done by two series connected resistors 321, 322. The capacitor 325 is used to filter noise off the divided down signal. The microcontroller 302 keep tracks of the voltage of the battery pack 110 via the divided voltage ADC_VBAT 326 signal line. If the voltage of the battery pack 110 is lower than a predetermined value, then the microcontroller 302 will disable the discharge operation. This function prevents over discharge of the batteries within the battery pack 110.

Figure 16D:
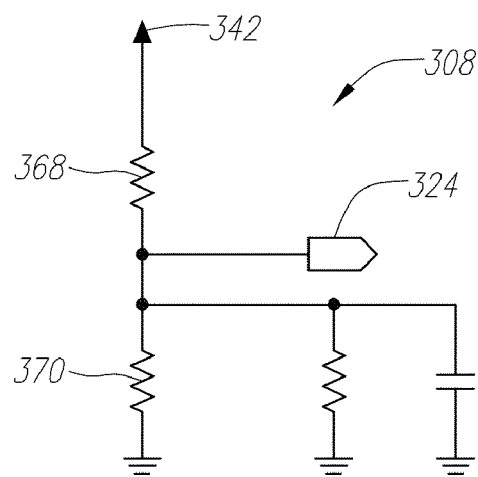

FIG. 16D is a schematic diagram of the temperature sensing circuit 308 for sensing the temperature of the battery pack 110. The temperature sensing circuit 308 preferably includes a thermistor 370 having a resistance that decreases with increasing ambient temperature. The thermistor 370 together with a resistor 368 that is coupled with other RC components may provide an output signal line ADC_TEMP 324 to the microprocessor's embedded analog-to-digital converter. Temperature is monitored so that when the temperature on the battery pack 110 exceeds a certain temperature, e.g., 75° C., the microcontroller 302 may shut off the charge and discharge operations. Normal operations may be enabled again once the temperature on the battery pack 110 is lower than a certain temperature, e.g., 70° C.

Figure 16E:
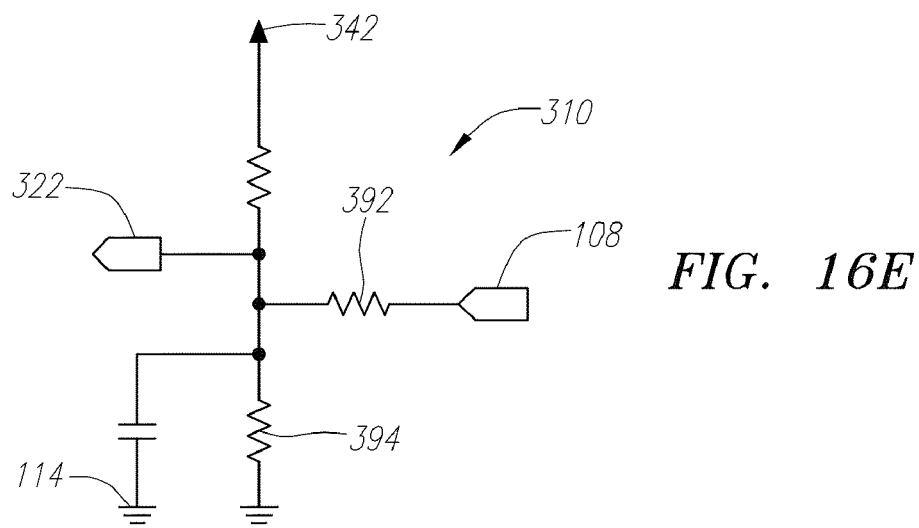

FIG. 16E is a schematic diagram of the load detect resistor bias network 310. The load detect resistor bias network 310 provides a voltage on signal line ADC_VPACK− 322 that indicates the output current. The load detect resistor bias network 310 is a voltage divider of the 4.0 volts rail that becomes influenced by the voltage formed on the negative conductive end 108. The voltage formed on the negative conductive end 108 may result from the current being discharged through MOSFETS 316, 318. The nominal resistance of MOSFETS 316, 318 is 0.050 ohms each, or a total of 0.10 ohms. As the output current of the battery pack 110 increases, the voltage formed on signal line ADC_VPACK− 322 increases.

Figure 16F:
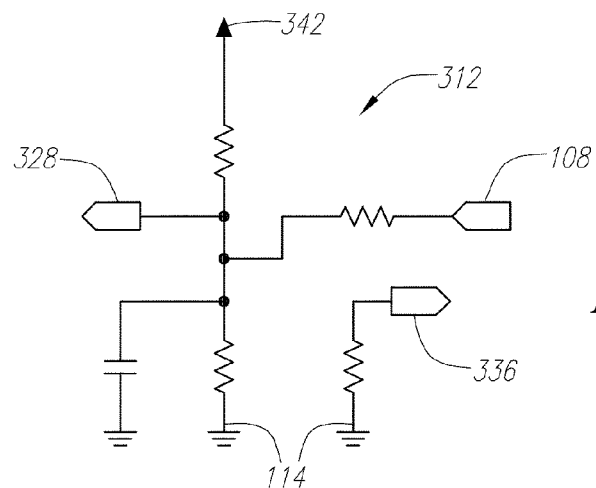

FIG. 16F is a schematic diagram of the charge detect resistor bias network 312. The charge detect resistor bias network 312 may be similar to the load detect resistor bias network 310 in FIG. 16E with the exception that the charge detect resistor bias network 312 may be more sensitive to detecting electric currents of a smaller magnitude. The charge detect resistor bias network 312 may compare the voltages from the negative conductive end 108 and the negative electrode 114 (of the battery pack 110) shown as a ground symbol. The compared output on signal line ADC_R_ISENSE+ 328 together with a reference on signal line ADC_R_ISENSE− 336 may be sent to the microcontroller 302. Inside this ADC channel may be an amplifier with a fixed gain of 20. This provides extra sensitivity to detect smaller current changes across two n-channel MOSFETs 316, 318.

Figure 16G:
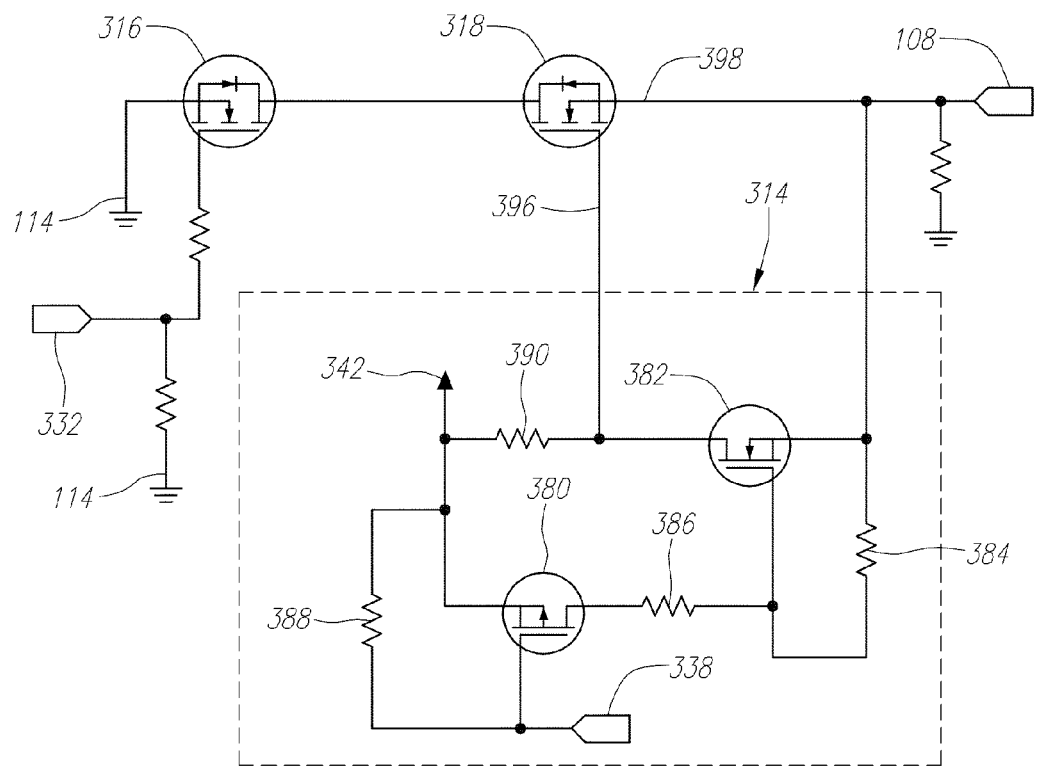

FIG. 16G shows a schematic diagram of the charging MOSFET driver circuit 314 and its relationship with two n-channel MOSFETs 316, 318. The charging MOSFET driver circuit 314 may comprise a p-channel metal-oxide-semiconductor field-effect transistor (PMOS) 380 with its gate connected to a signal line CHARGE_ENABLE 338 from the microcontroller 302. The source of PMOS 380 may be connected to the 4.0 volt power supply 342 while the drain may be connected to one end of a resistor 386. The other end of the resistor 386 may be connected to the gate of an NMOS 382 with its source connected to the negative conductive end 108 and drain to one end of a resistor 390. The other end of the resistor 390 may be connected to the 4.0 volts power supply 342.

The drains of the two n-channel MOSFETs 316, 318 may be connected together while their sources are connected to the negative conductive end 108 and the negative electrode 114 of the battery pack 110, respectively. The gate of NMOS 316 may be coupled to signal line LOAD_ENABLE/MISO 332 from the microcontroller 302. The gate of NMOS 318 may be coupled to the drain of NMOS 382.

NMOS 316 may be used to enable and/or disable the discharge of batteries in the battery pack 110. Referring to FIGS. 15 and 16G, an electrical current path for discharge may be formed from the positive electrode 112 of the battery pack 110 to the positive conductive end 106 of the battery pack assembly 100 to the lamp 10 and back to the negative conductive end 108 of the battery pack assembly 100 and to the negative contact pad on the printed circuit board 170. The path may continue through n-channel MOSFETs 318, 316 and then finally to the negative electrode 114 of the battery pack 110. The ground symbol shown refers to the negative electrode 114 of the battery pack 110.

In the present embodiment, during the power saving mode, which will be described in more detail later, signal line LOAD_ENABLE/MISO 332 (which is coupled to the gate of NMOS 316) may be set to high for a certain percentage of the time, e.g., 50%, and low for the rest of the time so that the electrical current path for discharge described above would be closed for a certain percentage of time, e.g., 50% of the time, and thus, power may be saved. In the same manner, during the blinking or SOS modes, which will be described in more detail later, signal line LOAD_ENABLE/MISO 332 can be set to high for a portion of the time so that the electrical current path for discharge would be open for a portion of the time to perform different functions. In another embodiment, when over-discharge is detected, signal line LOAD_ENABLE/MISO 332 is set to low to block the above-mentioned electrical current path for discharge. In another embodiment, when over-temperature is detected, signal line LOAD_ENABLE/MISO 332 is set to low to block the above-mentioned electrical current path for discharge. Yet in another embodiment, when a short circuit is detected, signal line LOAD_ENABLE/MISO 332 is set to low to block the above-mentioned electrical current path for discharge.

NMOS 318 may be used to enable charging of the batteries of the battery pack 100. The electrical current path for charging of the batteries may be formed from the power of a charging cradle (not shown) to the positive conductive end 106 of the battery pack assembly 100 to the positive electrode 112 of the battery pack 110 to the negative electrode 114 of the battery pack 110. The path continues through n-channel MOSFETs 316, 318 and then to the negative conductive end 108 of the battery pack assembly 100 and finally to the ground of the charging cradle.

The charging MOSFET driver circuit 314 may be used to provide a simple interface for the microcontroller 302 to enable and/or disable charging by controlling NMOS 318. In order to turn off NMOS 318, the voltage difference between the gate and the source of NMOS 318 must be very close to 0 volts. Since an external voltage (from the charging cradle) is applied during battery charging, the voltage formed at the negative conductive end 108 of the battery pack assembly 100 can become negative if NMOS 318 is not conducting (or in the "off" position). This situation may result in not being able to disable the battery charge. The charging MOSFET driver circuit 314 may be used to insure that the gate 396 to source 398 voltage of NMOS 318 is very close to 0 volts by connecting them to the drain and source of another NMOS 382 respectively.

NMOS 318 may also be used to disable the charging of the batteries of the battery pack 100. For example, when it is desired to switch from C/10 standard charge to C/20 trickle charge, microcontroller 302 may send out a 50% duty cycle signal to signal line CHARGE_ENABLE 338. This 50% duty cycle signal on signal line CHARGE_ENABLE 338 can provide a 50% duty cycle on and off to the gate 396 of NMOS 318. In accordance, the charge rate can be reduced by half.

In this manner, the battery pack assembly 100 of the current invention may be used as a retrofit in previously existing flashlights and their associated charging cradles even if they were not designed to provide a trickle charge as in the case of NiCd batteries. That is, the battery pack assembly 100 itself includes a circuit that will convert the charge to a trickle charge at the appropriate time. Accordingly, previously existing flashlights that had used a NiCd battery and charger without trickle charge capability may still be used with the battery pack assembly 100 of the current invention.

NMOS 318 may also provide a communication between the batteries of the battery pack 100 and the charging cradle. When the flashlight 90 is first placed on the cradle, the charge detection circuit 310 of the battery pack 100 preferably detects that a battery charge has started. A predefined period of time may be counted and then the microcontroller 302 may transmits data to the cradle by modulating NMOS 318. In one embodiment, the predefined period of time is 0.5 seconds.

The aspect of the invention providing for multiple functions is now described. In a preferred embodiment, the battery pack assemblies 100, 200 of the current invention that provide multiple functions may be retrofitted to previously existing flashlights that did not provide such functions. The printed circuit boards 170, 270 within battery pack assemblies may provide this functionality. Furthermore, the outer dimensions of the battery pack assemblies 100, 200 are preferably configured to fit within the inner dimension of the barrel or the previously existing flashlight, or other housing of a previously existing lighting device. To the extent that the diameter of the battery pack 110 or of the batteries 210, 211 are different than the batteries contained in the previously existing flashlight, the spacers 192, 292, and the distance between flat sides 126, 226, of the battery packs 100, 200 may be sized to accommodate any such difference.

For example, if the NiMH battery pack 100 or the Li-Ion batteries 210, 211 have a smaller diameter than the NiCd batteries they are replacing, the spaces 192, 292 and flat sides 126, 226 may be dimensioned to take up this slack so that the outer dimension of the battery pack assemblies 100, 200 may snugly fit within the barrel of the previously existing flashlight. However, it should be noted that the retrofitting of functionality is not limited to NiMH or Li-Ion batteries. Indeed, batteries that are not generally considered rechargeable may be used in the battery pack of the current invention and still provide certain types of functionality to a previously existing flashlight.

In a preferred embodiment, the flashlight 90, 490 may have five modes of operation due to the multi functionality provided by battery pack assemblies 100, 200. Each mode of operation allows the flashlight 90, 490 to perform one of five specific features, such as, for example, normal operation, power save, blink, SOS or beacon. When the flashlight 90, 490 is turned on, it will generally function in a first operating mode. In the present embodiment, the first operating mode may be a normal flashlight mode.

While the flashlight 90, 490 is in the first operating mode, if a sequence of three quick "on" pulses of the flashlight switch, i.e., three "momentary on" is detected, the flashlight 90, 490 may change to a second operating mode. The sequence of three "momentary on" may be performed by pushing the switch button half-way down three times. In the present embodiment, each push may be separate by about 0.5 seconds. While the flashlight 90, 490 is in the second operating mode, if another sequence of three "momentary on" is detected, the flashlight 90, 490 may change to a third operating mode, and so on. In the present embodiment, while the flashlight 90, 490 is in the fifth operating mode, if another sequence of three "momentary on" is detected, the flashlight 90, 490 may change back to the first operating mode.

Table 1 is a summary of operating modes for flashlight 90, 490.

TABLE 1

Summary of operating modes.

| Mode Order | Operation |
| --- | --- |
| First | NORMAL |
| Second | POWER SAVE |
| Third | BLINK |
| Fourth | SOS |
| Fifth | BEACON |

In general, the NORMAL mode may provide a constant beam of standard brightness, the POWER SAVE mode may increase the amount of time a beam of light may be provided, the BLINK mode may provide a safety blink beam, the SOS mode may provide the international distress signal and the BEACON mode may provide an extended time of blinking.

The operation of the flashlight 90, 490 in the different modes will now be described in connection with Table 2 and FIGS. 15 and 16A-16G. Table 2 is a summary of the status of NMOS 316 and NMOS 318.

TABLE 2

Summary of the status of NMOS 316 and NMOS 318.

|  | NMOS 316 | NMOS 318 |
|---|---|---|
| NORMAL | On | On |
| POWER SAVE | 50% duty cycle | On |
| BLINK | Blinking | On |
| SOS | Blinking | On |
| BEACON | Blinking | On |
| CHARGE | On | On |
| TRICKLE CHARGE | On | 50% duty cycle |
| SHORT CIRCUIT | Off | On |
| OVER DISCHARGE | Off | On |
| OVER TEMPERATURE | Off | Off |

In one embodiment, when the flashlight 90, 490 is turned on, the flashlight 90, 490 is operated in a normal mode. Both NMOS 316 and NMOS 318 are turned on (or conduct) so that a discharging path is formed as described previously. The microcontroller 302 may constantly monitor the charge detect resistor bias network 312 and load detect resistor bias network 310 to determine the condition of the flashlight 90.

Table 3 shows sample voltages output from ADC_VPACK− 322 (VADC) from the load detect resistor bias network 310 measured by the microcontroller 302. In Table 3, Iout is the current flowing from the positive electrode 112 of battery pack 110, to the load (lamp 10), and back to the negative electrode 114 of the battery pack 110. Vpack− is the voltage at the negative conductive end 108. ADC is the current flowing from signal line ADC_VPACK− 322. The nominal current drawn by the lamp 10 is 1.6 Amps. From Table 3, the corresponding ADC measurement form the load detect resistor bias network 310 is approximately 285. Since the actual current draw varies from lamp to lamp, a lower load threshold is used. In one example, the nominal value for a load present is 285 and the value for no load is 260. The difference is split and the resulting value, 272, may be used at the load detect threshold.

TABLE 3

Load detection.

| Iout | Vpack− | VADC | ADC |
|---|---|---|---|
| 30 | 1.5 | 0.80 | 747 |
| 20 | 1 | 0.63 | 585 |
| 10 | 0.5 | 0.45 | 422 |
| 5 | 0.25 | 0.37 | 341 |
| 4 | 0.2 | 0.35 | 325 |
| 3 | 0.15 | 0.33 | 308 |
| 2 | 0.1 | 0.31 | 292 |
| 1 | 0.05 | 0.30 | 276 |
| 0.5 | 0.025 | 0.29 | 268 |
| 0.3 | 0.015 | 0.28 | 265 |
| 0.1 | 0.005 | 0.28 | 261 |
| 0 | 0 | 0.28 | 260 |

When the flashlight 90, 490 is switched to the power save mode, NMOS 318 is still turned on while NMOS 316 is turned on for 50% of the time and turned off for the remaining 50% of time. This may be done by sending a 50% duty cycle signal to signal line LOAD_ENABLE/MISO 332 by the microcontroller 302. The frequency of the 50% duty cycle signal is higher than a human eye can detect, for example, 100 Hz.

When the flashlight 90, 490 is further switched to the blink mode, NMOS 318 is turned on while NMOS 316 is turned on for 50% of the time and turned off for the remaining 50% of time. This may be done by sending a 50% duty cycle signal to signal line LOAD_ENABLE/MISO 332 by the microcontroller 302. The frequency of the 50% duty cycle signal is low enough for a human eye to detect, for example, 0.5 Hz to 1.0 Hz.

When the flashlight 90, 490 is further switched to the SOS mode, NMOS 318 is turned on while NMOS 316 follows with a sequence of three short blinks (dits), three long blinks (dashes), and three short blinks (dits). This may be done by sending a sequence of three short 50% duty cycle signals, followed by three long 50% duty cycle signals and followed by another three short 50% duty cycle signals to signal line LOAD_ENABLE/MISO 332 by the microcontroller 302. The frequency for both the long 50% duty cycle and short 50% are low enough for a human eye to detect.

When the flashlight 90, 490 is further switched to the beacon mode, NMOS 318 is turned on while NMOS 316 is turned on for a very short period of the time and turned off for the rest of time. This can be done by sending a low duty cycle, for example, 1.4% to 17%, signal to signal line LOAD_ENABLE/MISO 332 by the microcontroller 302. The frequency of the low duty cycle signal is low enough for a human eye to detect, for example, 0.5 Hz to 1.0 Hz.

When the flashlight 90, 490 is being charged, both NMOS 316 and NMOS 318 are turned on to form a portion of the charging path. Table 4 shows the ADC measurements made from the charge detecting circuit.

TABLE 4

Charge detection.

| Iout | Vpack− | VADC | ADC |
|---|---|---|---|
| 6 | 0.3 | 2.83 | 1023 |
| 4 | 0.2 | 2.08 | 1023 |
| 2 | 0.1 | 1.34 | 1023 |
| 1 | 0.05 | 0.97 | 901 |
| 0.5 | 0.025 | 0.78 | 728 |
| 0.3 | 0.015 | 0.71 | 658 |
| 0.1 | 0.005 | 0.63 | 589 |
| 0 | 0 | 0.60 | 554 |
| −0.1 | −0.005 | 0.56 | 520 |
| −0.3 | −0.015 | 0.48 | 450 |

If the flashlight is idle (not charging or discharging), then the charge detect resistor bias network 312 may detect Iout as 0 Amps, which corresponds to an ADC value of 554. When the flashlight is placed on a charging cradle, a charging current of 225 mA will be sourced to charge the battery pack 110. It should be noted that a charging current is seen as a negative load current in this design. Referring to Table 4, a charging current of −0.225 Amps corresponds to an ADC value of approximately 476. A threshold level for this detection is set right in between 476 and 554 to accommodate any variations in charge current and/or MOSFET resistances. Once charge is detected, the battery pack 110 will keep track of charging time and after 16 hours of continuous charge, the battery pack will convert the charging current to a trickle charge.

Previously existing flashlights, like those originally designed for other battery packs, such as NiCd, provide a constant current of 225 mA indefinitely. Accordingly, the NiMH battery pack assembly 100 preferably converts it to a trickle charge after about 16 hours of charge. The 225 mA current represents a charge rate of C/10. For trickle charge, the charge rate is C/20. To accomplish this, NMOS 316 is turned on while NMOS 318 is turned on for 50% of the time and turned off for the remaining 50% of time. This can be done by sending out a 50% duty cycle signal to signal line CHARGE_ENABLE 338 from microcontroller 302. This 50% duty cycle signal on signal line CHARGE_ENABLE 338 can provide a 50% duty cycle on and off to the gate 396 of NMOS 318. In accordance, the average charge current is reduced to 122 mA, or C/20. Accordingly, the battery pack assembly 100 of the current invention may be used with previously existing flashlights that had used NiCd batteries and chargers without trickle charge capability.

Similarly, in the case of battery pack assembly 200 which may involve a Li-Ion battery, the printed circuit board 270 of battery pack assembly 200 preferably converts the charging algorithm of the existing cradle to a two phase charge of a constant current phase followed by a constant voltage phase. In any event, it is preferred that either battery pack assembly 100, 200 may accept the charging algorithm from the existing cradle and internally convert it to an algorithm suitable to match its battery chemistry.

When the flashlight 90 is removed from the cradle, the trickle charge is complete. When the flashlight is then placed back to the cradle, the entire 16 hour charge plus trickle routine is re-started.

As described previously, once a load is detected, the flashlight 90, 490 may monitor the load detect resistor bias network 310 to determine whether the load is a lamp or a short circuit. Referring to Table 3, ADC values are tabulated for output currents of up to 30 Amps. A characteristic of a filament is that the resistance of a lamp is very low when the lamp is not energized. Once the lamp is energized, the filament resistance rises exponentially as the filament heats and begins to light. A very high current spike is allowed to pass through the lamp as this is expected when first turning on a lamp. The duration of this spike is very short and will not damage NMOS 316 and NMOS 318 which also allow the same current spike to pass through. If after a predefined duration, however, the load current has not dropped to an expected level (~1.6 Amps), then a short circuit condition is detected and the discharge path may be shut off. If the load current does drop to an expected level, the flashlight may continue to operate until the user turns the light off.

Once a short circuit is detected, NMOS 316 may be disabled to disconnect the battery pack 110 from the load. The battery pack 110 will be kept in this "disabled" mode until the load is removed. The load detect resistor bias network 310 may then return a very high ADC value if a load is present and NMOS 316 is off. Once the load is removed, the ADC value may return to a normal no load value, e.g., 260, and the flashlight 90, 490 may resume normal operation.

When over discharge is detected, NMOS 316 may be turned off. As previously described in connection with FIG. 16C, the microcontroller 302 may keep track of the voltage of the battery pack 110 via the divided voltage ADC_VBAT 326 signal line. If the voltage of the battery pack 110 is lower than a predetermined value, then the microcontroller 302 may disable the discharge operation by sending a low signal to signal line LOAD_ENABLE/MISO 332 to turn off NMOS 316. This function preferably prevents over discharge of the batteries within the battery pack 110.

When over temperature is detected, both NMOS 316 and NMOS 318 may be turned off. As previously described in connection with FIG. 16D, temperature is monitored so that when the temperature on the battery pack 110 exceeds a certain temperature, e.g., 75° C., the microcontroller 302 may shut off the charge and discharge operations by turning off both NMOS 316 and NMOS 318. Normal operations may be enabled once the temperature on the battery pack 110 is lower than a certain temperature, e.g., 70° C.

In addition, the printed circuit board 170 may provide the protection previously described, e.g., protection against overcharge, over discharge and over current, even when battery pack assembly 100 is removed from flashlight 90. When the battery pack assembly 100 is removed from flashlight 90, the positive conductive end 106 and the negative conductive end 108 are exposed and abnormal contacts with them could cause damages to the battery pack 110. Accordingly, that printed circuit board 170 resides within battery pack 110 provides continuous protection even when removed from the flashlight.

During battery charge operation, the battery pack 100 may also transmit information. The information transmitted may be arranged in the following sequence: charging detected, one second pause, transmit timing byte, transmit data, two second pause, followed by temperature and voltage data. This formatting of data may be similar to the RS232 protocol with a start bit followed by 8 data bits and finally by a stop bit. In this manner, the start bit is always 0 and the stop bit is always 1. Disabling charge corresponds to a 0 while charge enabled corresponds to a logic 1. The data to be transmitted may include: day of manufacturing, month of manufacturing, year of manufacturing, code version, hardware version, unique ID, started charge cycles, completed charge cycles, hours of use, calibration data, max temperature, and number of greater than 70° C. (or other temperature) events.

Battery voltage and battery temperature information may be transmitted every twenty seconds (or other time multiple) until a trickle charge occurred. The baud rate of the system may be approximately 9600.

Since the microcontroller 302 obtains its time base from a passive RC oscillator, there may be a significant tolerance on the baud rate. Therefore, a timing byte may be transmitted so that the charging device may measure and adjust it's time base to match. The timing byte may be generated by transmitting a series of ten bits (including the start and stop bits) with the pattern of 0101010101. Since the pattern is known ahead of time, the charging device will receive the pattern and measure the time of each bit. This may be used to adjust the baud rate of the receiving (charging) device.

In order to charge at a much faster charge rate, for example, one or two hours, the battery voltage and battery temperature should be monitored to prevent over charge of the batteries. During charge, the charge cradle receives the voltage and temperature measurements over the existing charge path every 20 seconds (or other time multiple) and may charge accordingly.

As previously described, data such as day of manufacturing, month of manufacturing, year of manufacturing, code version, hardware version, unique ID, started charge cycles, completed charge cycles, hours of use, calibration data, max temperature, and number of greater than 70° C. (or other temperature) events can be stored in the battery pack assemblies 100, 200 and updated during a charge operation. This data can be read for occasions such as troubleshooting or statistical analysis.

The printed circuit board 270 (shown in FIG. 11) may generally have the same design as the printed circuit board 170 which has been described in detailed in connection with FIGS. 15, 16A-G. Appropriate modifications may be made however, to accommodate the charging of a Li-Ion battery.

While various embodiments of an improved flashlight and its respective components have been presented in the foregoing disclosure, numerous modifications, alterations, alternate embodiments, and alternate materials may be contemplated by those skilled in the art and may be utilized in accomplishing the various aspects of the present invention. For example, the power control circuit and short protection circuit described herein may be employed together in a flashlight or may be separately employed. Further, the short protection circuit may be used in rechargeable electronic devices other than flashlights. Thus, it is to be clearly understood that this description is made only by way of example and not as a limitation on the scope of the invention as claimed below.

What is claimed:

1. A battery pack assembly for use in a lighting device, said battery pack assembly comprising:
   a negative conductive end;
   a battery pack having a positive end and a negative end;
   a cylindrically shaped housing having a base and a cover, the base having a front end, a rear end, and a chamber having a curved part and two flat sides, the cover having a front end, a rear end, and a chamber having a curved part and two flat sides, the sides of the chamber of the base having a plurality of aligned inner slots and a plurality of alternately aligned outer slots and tabs, the sides of the chamber of the cover having a plurality of aligned inner slots and a plurality of alternately aligned outer slots and tabs, the alternately aligned outer slots and tabs of the base and the cover being offset such that when the cover and the base are joined together, a plurality of mechanical locks are formed;
   a positive contact bracket having a positive conductive end, the positive contact bracket being coupled to the positive end of the battery pack, the positive contact bracket having a plurality of tabs plugged into the aligned inner slots of both the base and the cover;
   a negative contact bracket coupled to the negative conductive end, the negative contact bracket having a contact spring coupled to the negative end of the battery pack, the negative contact bracket having a plurality of tabs plugged into the aligned inner slots of both the base and the cover; and
   a printed circuit board installed in the cylindrically shaped housing, the printed circuit board coupled to the positive conductive end and the negative conductive end.

2. The battery pack assembly of claim 1, wherein the battery pack has a plurality of batteries connected in series.

3. The battery pack assembly of claim 2, wherein the plurality of batteries are NiMH.

4. The battery pack assembly of claim 1, wherein the chambers of the base and the cover have a plurality of spacers positioned on the curved part, and the outer radius of the battery pack contacts only with the spacers and the flat sides of chambers.

5. The battery pack assembly of claim 1, wherein the positive contact bracket has a guide to facilitate insertion of the battery pack in the housing.

6. The battery pack assembly of claim 1, wherein the base of the cylindrically shaped housing includes a front battery stop and a rear battery stop that limit the movement of the battery pack in a longitudinal direction.

7. The battery pack assembly of claim 1, wherein the base of the cylindrically shaped housing includes a sliding spring ramp on the rear end to allow adjustability of the contact spring to accommodate a tolerance in the length of the battery pack.

8. The battery pack assembly of claim 1, wherein the printed circuit board is installed near the rear end.

9. The battery pack assembly of claim 8, wherein the negative contact bracket has a locator to hold and contact with the printed circuit board.

10. A battery pack assembly for use in a lighting device, said battery pack assembly comprising:
    a negative conductive end;
    a cylindrically shaped housing having a base and a cover, the base having a front end, a rear end, and a plurality of chambers having a positive end, a negative end, a curved part and two flat sides, the cover having a front end, a rear end, and a plurality of chambers having a positive end, a negative end, a curved part and two flat sides, the sides of the plurality of chambers of the base having a plurality of aligned inner slots and a plurality of alternately aligned outer slots and tabs, the sides of the plurality of chambers of the cover having a plurality of aligned inner slots and a plurality of alternately aligned outer slots and tabs, the alternately aligned outer slots and tabs of the base and the cover being offset such that when the cover and the base are joined together, a plurality of mechanical locks are formed;
    a plurality of batteries inserted in the plurality of chambers, each battery having a positive end and a negative end with the positive end of the battery adjacent to the positive end of the chamber;
    a positive contact bracket having a positive conductive end, the positive contact bracket coupled to the positive end of each battery, the positive contact bracket having a plurality of tabs plugged into the aligned inner slots of both the base and the cover;
    a negative contact bracket coupled to the negative conductive end, the negative contact bracket having a plurality of contact springs coupled to the negative ends of the batteries, the negative contact bracket having a plurality of tabs plugged into the aligned inner slots of both the base and the cover; and
    a printed circuit board installed in the cylindrically shaped housing, the printed circuit board coupled to the positive conductive end and the negative conductive end.

11. The battery pack assembly of claim 10, wherein the plurality of batteries are Li-Ion.

12. The battery pack assembly of claim 10, wherein each of the chambers has a plurality of spacers positioned on the curved part and the flat sides, and the outer radius of the batteries contact only with the spacers.

13. The battery pack assembly of claim 10, wherein the positive contact bracket has a plurality of guides to facilitate the insertion of the batteries.

14. The battery pack assembly of claim 10, wherein the printed circuit board is installed near front end.

15. The battery pack assembly of claim 14, wherein the negative contact bracket has a locator to hold and contact the printed circuit board.

16. A battery pack assembly for use in a lighting device, said battery pack assembly comprising:
    a positive conductive end;
    a negative conductive end;
    a battery pack having a positive end and a negative end;
    a cylindrically shaped housing for holding the battery pack; and a printed circuit board installed in the cylindrically shaped housing, the printed circuit board having a positive contact and a negative contact, the positive contact of the printed circuit board being coupled to the positive end of the battery pack and the positive conductive end, and the negative contact of the printed circuit board being coupled to the negative end of the battery pack and the negative conductive end.

17. A rechargeable flashlight comprising:
a light source;
a reflector that reflects light emitted from the light source;
a cylindrically shaped battery pack assembly coupled to the light source, wherein the battery pack assembly has a source of energy and a printed circuit board; and
a hollow cylindrical barrel for holding the battery pack assembly therein.

18. The rechargeable flashlight of claim 17, wherein the source of energy is a plurality of NiMH batteries connected in series.

19. The rechargeable flashlight of claim 17, wherein the source of energy is a plurality of Li-Ion batteries connected in parallel.

20. A rechargeable flashlight comprising:
a switch;
a light source;
a reflector that reflects light emitted from the light source;
a cylindrically shaped battery pack assembly having a source of energy and a printed circuit board coupled to the light source, wherein the printed circuit board regulates current flow through the light source to perform at least two modes of operation.

21. A rechargeable flashlight of claim 20, wherein the modes of operation are chosen by toggling the switch.

22. A rechargeable flashlight of claim 20, wherein one of the at least two modes of operation is a power save mode.

23. A battery pack assembly for providing multiple functions to a flashlight having a light source and an on/off switch, the battery pack assembly comprising:
a housing configured to fit within the flashlight, the housing having a positive conductive end and a negative end that are coupled to the light source and the on/off switch;
a printed circuit board located within the housing and coupled to the positive and negative conductive ends, the printed circuit board including electronics configured to provide multiple functions; and
a battery pack located within the housing that is coupled to the housing and the printed circuit board;
wherein a sequence of pulses of the on/off switch is detected by the printed circuit board to provide one of the multiple functions.

24. The battery pack assembly of claim 23, wherein the multiple functions include power save, blink, SOS and/or beacon.

25. The battery pack assembly of claim 23, wherein the battery pack includes a positive electrode that is coupled to the positive conductive end and the printed circuit board, and a negative electrode that is coupled to the printed circuit board.

26. The battery pack assembly of claim 23, wherein the printed circuit board includes a first NMOS circuit and a second NMOS circuit, and when providing the different functions, the first NMOS circuit is either turned on, undergoes a duty cycle or is blinking, and the second NMOS circuit remains on.

27. The battery pack assembly of claim 23, wherein the battery pack includes at least one NiMH battery.

28. The battery pack assembly of claim 23, wherein the battery pack includes at least one Li Ion battery.

29. The battery pack assembly of claim 23, wherein the electronics on the printed circuit board are further configured to recharge the battery pack.

30. The battery pack assembly of claim 29, wherein the electronics on the printed circuit board are further configured to provide a standard charge and a trickle charge.

31. A rechargeable battery pack assembly for a flashlight that is configured to be electrically coupled to a charging device, comprising:
a housing configured to fit within the flashlight, the housing having a positive conductive end and a negative conductive end coupled to the flashlight;
a printed circuit board located within the housing and coupled to the positive and negative conductive ends; and
a battery pack located within the housing, the battery pack including at least one rechargeable battery that is configured to receive a charge from the charging device and that is coupled to the printed circuit board;
wherein the printed circuit board is configured to provide for the recharging of the at least one rechargeable battery, including providing a standard charge and a trickle charge.

32. The battery pack assembly of claim 31, the electronics on the printed circuit board including a microcontroller and an NMOS circuit, and wherein the microcontroller sends a 50% duty cycle signal to the NMOS circuit to reduce the charge rate to a trickle charge.

33. The battery pack assembly of claim 31, wherein the at least one rechargeable battery comprises a NiMH battery, and the at least one rechargeable battery may be charged by a charging device originally designed to provide only a standard charge.

34. A rechargeable battery pack assembly for a flashlight, comprising:
a housing configured to fit within the flashlight, the housing having a first end and a second end;
a positive conductive end and a negative conductive end both located at the first end of the housing;
at least two rechargeable batteries located within the housing that are electrically coupled in parallel and that are electrically coupled to the positive and negative conductive ends; and
a printed circuit board located within the housing and electrically coupled to the positive and negative conductive ends and to the at least two rechargeable batteries.

35. The rechargeable battery pack of claim 34 wherein the at least two rechargeable batteries comprise Li Ion batteries.

36. The rechargeable battery pack of claim 35, wherein the printed circuit is configured to provide for the recharging of the at least one rechargeable battery by providing a two phase charge of a constant current phase followed by a constant voltage phase.

37. The rechargeable battery pack of claim 34, further comprising:
a positive contact bracket that is electrically coupled to a positive electrode of each of the at least two rechargeable batteries, to the printed circuit board and to the positive conductive end; and
a negative contact bracket that is electrically coupled to a negative electrode of each of the at least two rechargeable batteries, to the printed circuit board and to the negative conductive end.

38. The rechargeable battery pack of claim 34, wherein the positive conductive end comprises a knub and the negative conductive end comprises an annular ring extending around the knub.

* * * * *